United States Patent
Chau et al.

(10) Patent No.: US 11,776,497 B2
(45) Date of Patent: Oct. 3, 2023

(54) GLOBAL AND LOCAL CONTRAST CONTROL WITH BRIGHTNESS AND SHADING ADJUSTMENT OF SMART GLASS DISPLAY

(71) Applicant: GM GLOBAL TECHNOLOGY OPERATIONS LLC, Detroit, MI (US)

(72) Inventors: Jarvis Chau, Markham (CA); Chris Wisniewski, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/531,287

(22) Filed: Nov. 19, 2021

(65) Prior Publication Data
US 2023/0162695 A1 May 25, 2023

(51) Int. Cl.
 G09G 3/34 (2006.01)
 G02F 1/1685 (2019.01)
 G09G 3/32 (2016.01)
 H04L 67/12 (2022.01)

(52) U.S. Cl.
 CPC .......... *G09G 3/344* (2013.01); *G02F 1/1685* (2019.01); *G09G 3/32* (2013.01); *G02F 2201/44* (2013.01); *G02F 2203/48* (2013.01); *G09G 2320/066* (2013.01); *G09G 2360/144* (2013.01); *G09G 2380/10* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 10,625,580 B1* | 4/2020 | Jones | G02F 1/0121 |
| 10,682,901 B2* | 6/2020 | Chu | G02F 1/13318 |
| 10,744,936 B1* | 8/2020 | Budhia | B60J 3/04 |
| 2003/0095397 A1* | 5/2003 | McGowan | G02F 1/1336 362/23.02 |
| 2004/0257649 A1* | 12/2004 | Heikkila | G03B 21/56 359/443 |
| 2005/0134477 A1* | 6/2005 | Ghabra | G07C 9/00309 455/73 |
| 2006/0088275 A1* | 4/2006 | O'Dea | H04N 21/42202 386/311 |
| 2006/0255960 A1* | 11/2006 | Uken | B60R 1/1207 340/815.4 |
| 2009/0015736 A1* | 1/2009 | Weller | B60R 1/12 362/494 |

(Continued)

OTHER PUBLICATIONS

U.S. Appl. No. 17/241,997, filed Apr. 27, 2021, Park et al.

*Primary Examiner* — Patrick N Edouard
*Assistant Examiner* — Peijie Shen

(57) ABSTRACT

A smart glass display includes a first glass layer, a second glass layer, a display layer, an auto-shading layer and a control module. The display layer is disposed between the first glass layer and the second glass layer and includes an array of light emitting diodes and at least one ambient light sensor. The at least one ambient light sensor is configured to detect a level of ambient light at the display layer. The auto-shading layer includes suspended particle devices each of which configured to selectively provide different levels of transparency. The control module is configured to, based on an output of the at least one ambient light sensor, adjust a transparency level of at least a portion of the auto-shading layer.

20 Claims, 14 Drawing Sheets

(56) References Cited

U.S. PATENT DOCUMENTS

| | | | |
|---|---|---|---|
| 2009/0085485 A1* | 4/2009 | Young | G09G 3/3406 315/155 |
| 2009/0237381 A1* | 9/2009 | Otani | G09G 3/3648 345/207 |
| 2011/0248973 A1* | 10/2011 | Kuhlman | G09G 3/3208 345/207 |
| 2011/0267279 A1* | 11/2011 | Alvarez Rivera | H01L 27/3244 445/24 |
| 2012/0132806 A1* | 5/2012 | Findlay | G01J 1/0271 250/208.2 |
| 2012/0218239 A1* | 8/2012 | Yao | G09G 3/3406 345/207 |
| 2013/0076712 A1* | 3/2013 | Zheng | G09G 5/10 345/207 |
| 2013/0093969 A1* | 4/2013 | Li | B60J 3/04 349/16 |
| 2014/0132158 A1* | 5/2014 | Land | H05B 47/10 315/149 |
| 2014/0376072 A1* | 12/2014 | Klettke | G02B 26/02 359/238 |
| 2015/0358520 A1* | 12/2015 | Thimmappa | H04N 5/232411 348/217.1 |
| 2016/0180809 A1* | 6/2016 | Mickelsen | G09G 5/026 345/207 |
| 2017/0124864 A1* | 5/2017 | Popple | G06K 7/1417 |
| 2018/0156660 A1* | 6/2018 | Turgeon | G09G 5/10 |
| 2019/0166674 A1* | 5/2019 | Mason | H04N 21/8133 |
| 2019/0369353 A1* | 12/2019 | Franklin | G02B 7/023 |
| 2019/0392780 A1* | 12/2019 | Hoover | G09G 3/20 |
| 2020/0057317 A1* | 2/2020 | Weindorf | G02F 1/0121 |
| 2020/0057421 A1* | 2/2020 | Trikha | H01L 27/3234 |
| 2020/0204853 A1* | 6/2020 | Mehrl | H04N 21/4318 |
| 2020/0292905 A1* | 9/2020 | Larry | G02F 1/157 |
| 2020/0342800 A1* | 10/2020 | Li | G06F 1/1637 |
| 2020/0382739 A1* | 12/2020 | Lu | G02F 1/133331 |
| 2021/0054691 A1* | 2/2021 | Ramirez | B60K 35/00 |
| 2021/0065552 A1* | 3/2021 | Jung | G01S 13/86 |
| 2021/0080321 A1* | 3/2021 | Kaehler | G01J 3/0262 |
| 2021/0291727 A1* | 9/2021 | Edquist | B64D 11/00 |
| 2021/0407439 A1* | 12/2021 | Lin | G09G 3/3426 |
| 2022/0075191 A1* | 3/2022 | Rittger | B60K 35/00 |
| 2022/0085129 A1* | 3/2022 | Mueller | H01L 27/3267 |
| 2022/0107540 A1* | 4/2022 | Lin | G02F 1/157 |

* cited by examiner

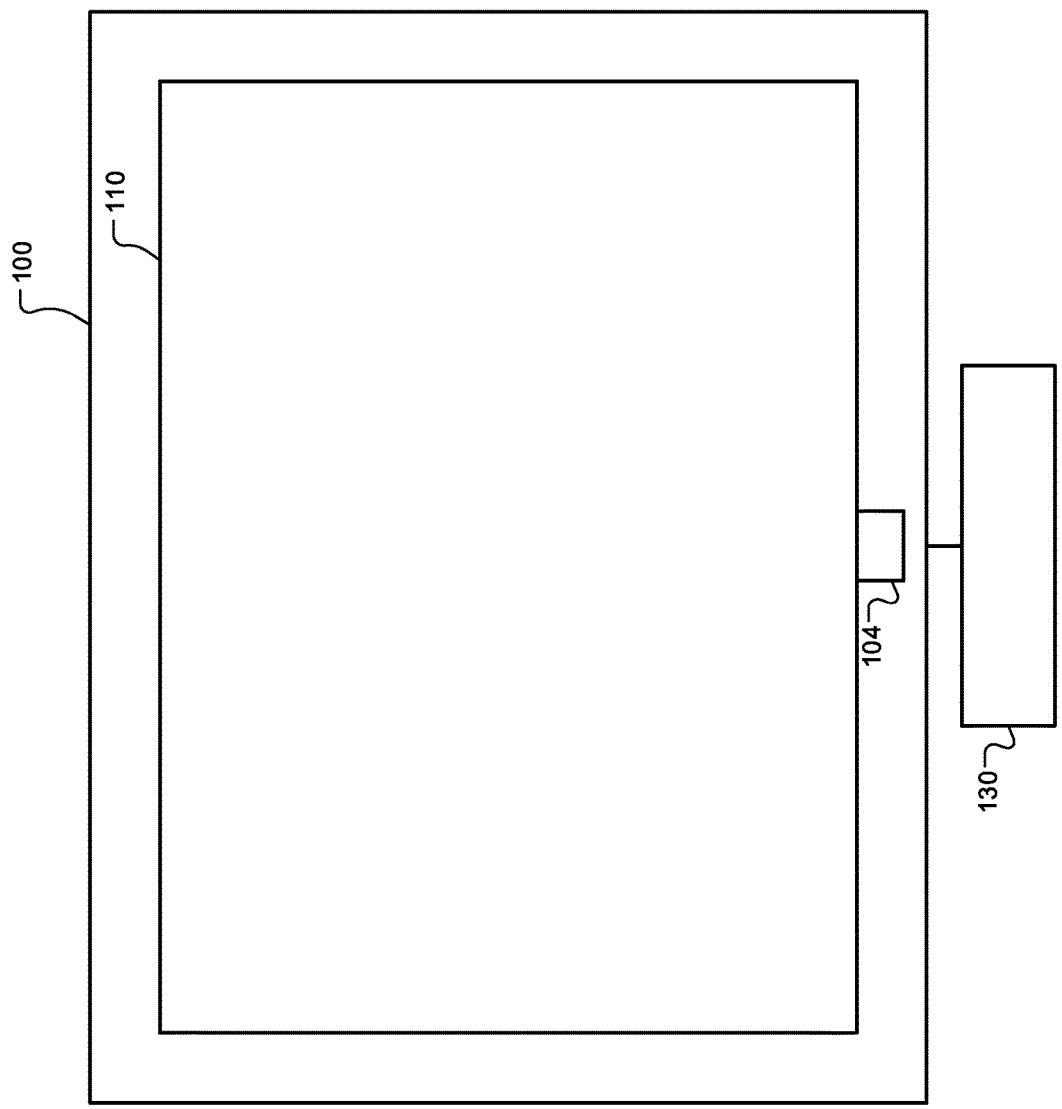
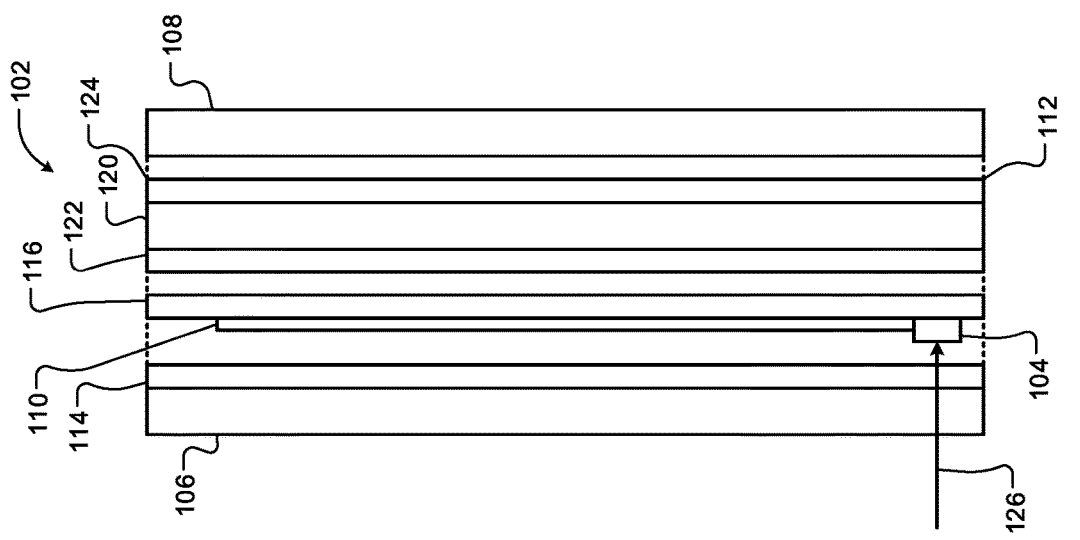
FIG. 1A
FIG. 1B

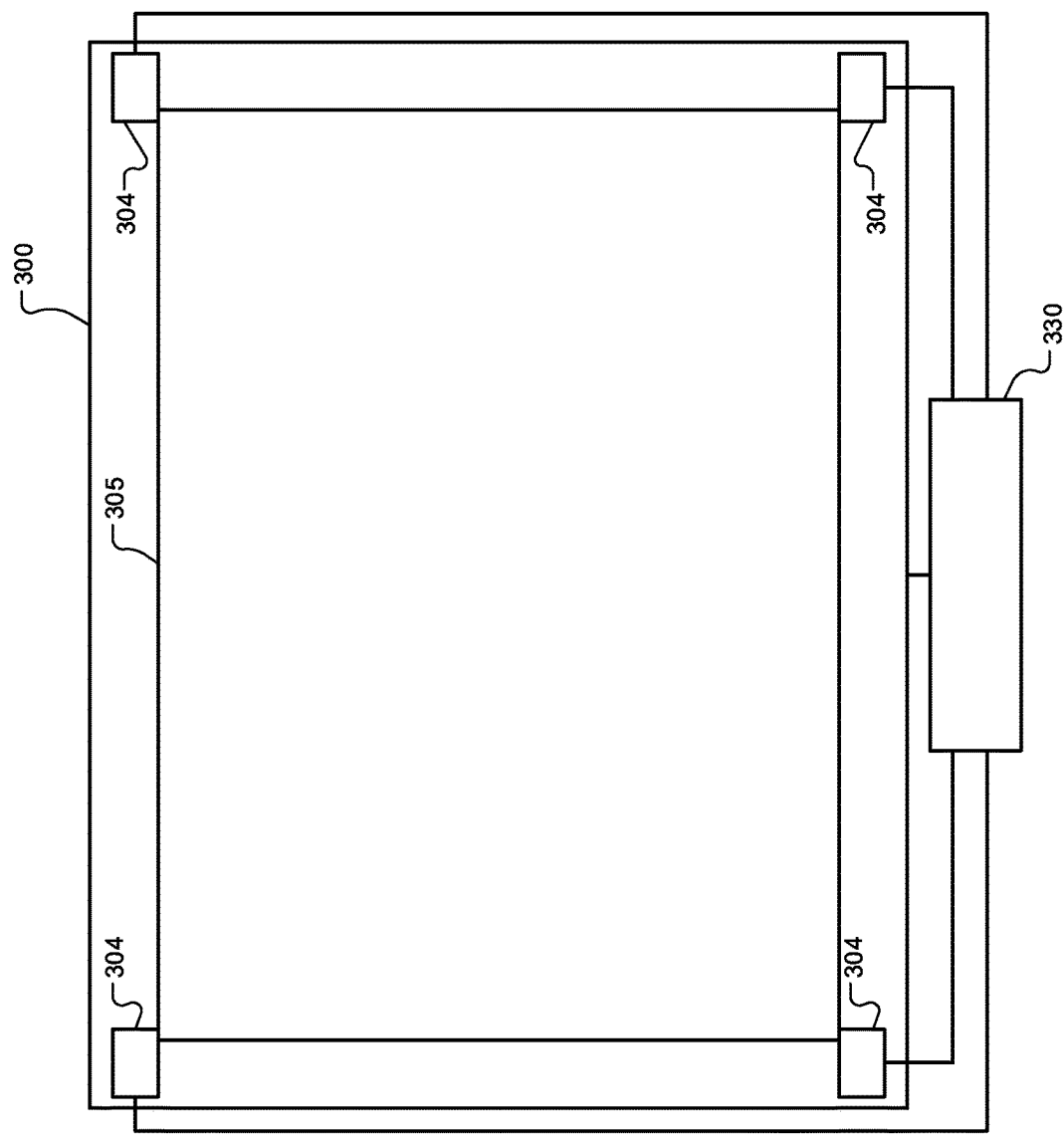
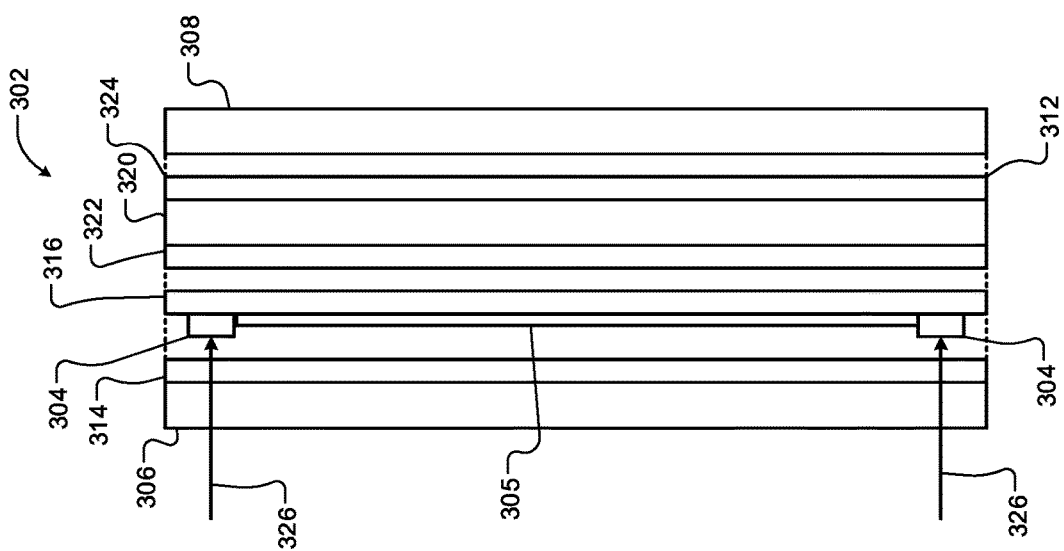

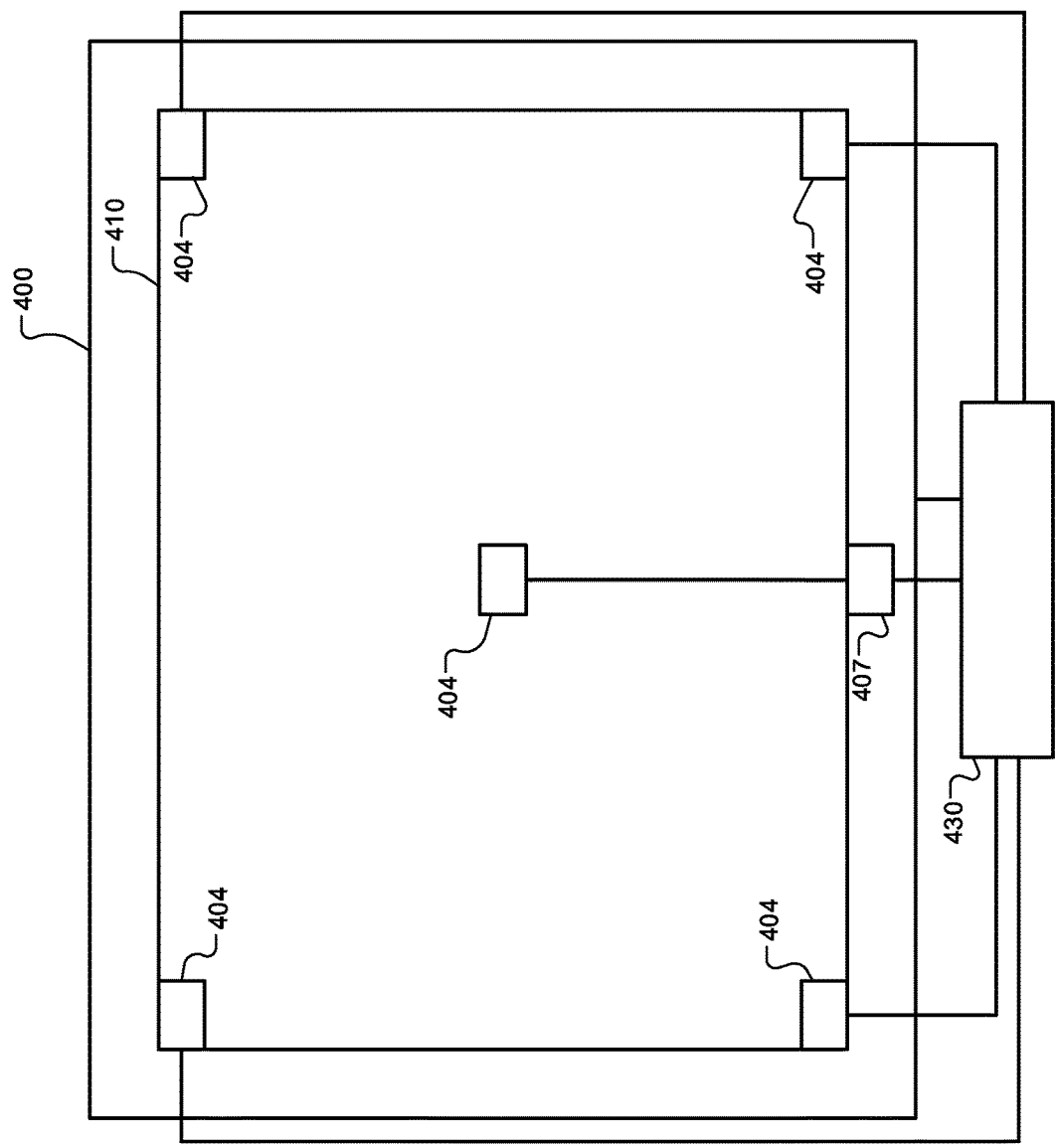
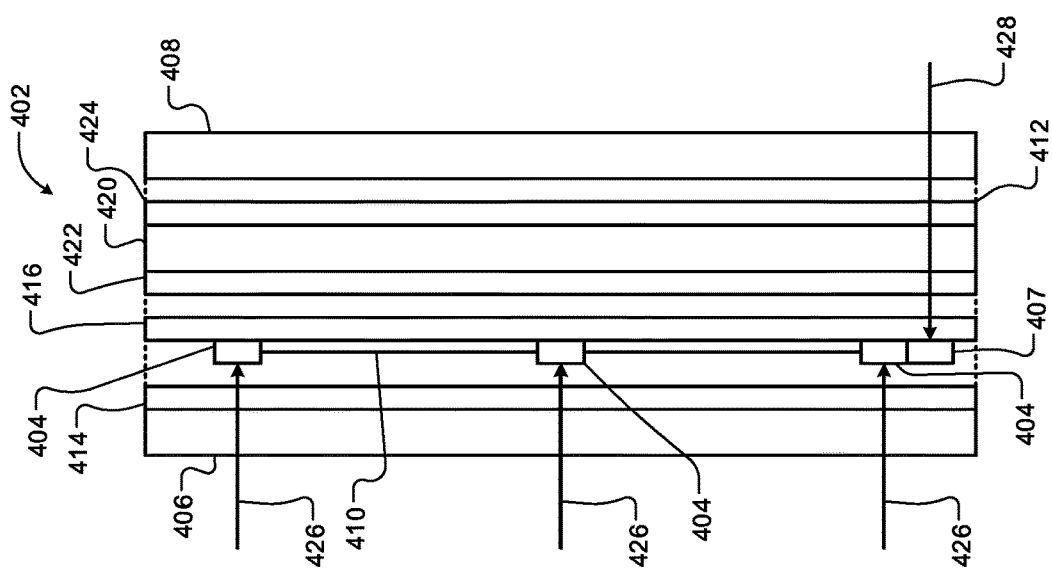

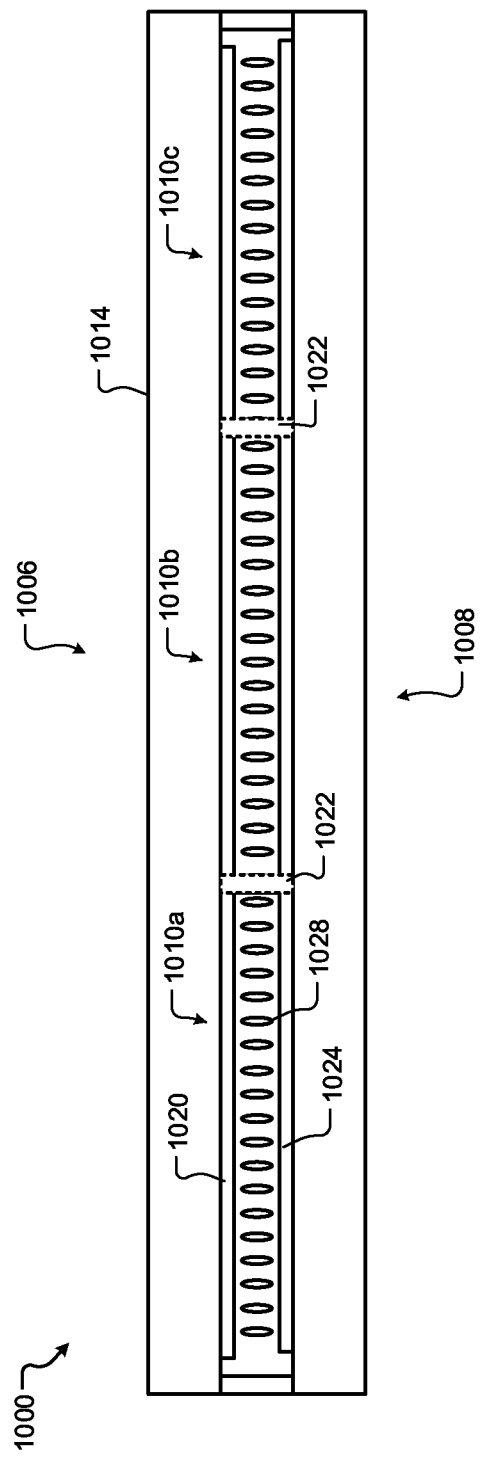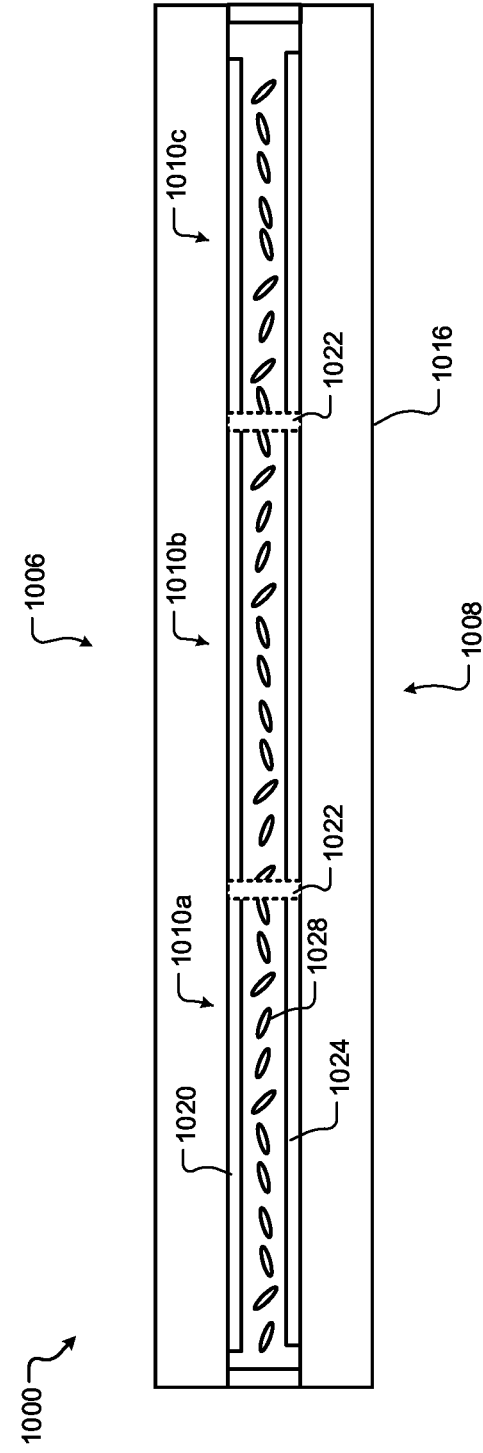

GLOBAL AND LOCAL CONTRAST CONTROL WITH BRIGHTNESS AND SHADING ADJUSTMENT OF SMART GLASS DISPLAY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display devices and more particularly to transparent display devices with automatic brightness and shading adjustment.

A display device may include a light emitting diode (LED) array that is arranged on a transparent layer such as glass. Transparent spaces are located between pixels of the LED array. As the spacing between the LEDs in the LED array increases, the level of transparency of the display device increases. Smaller scale display technologies such as micro LEDs can be used and provide an opportunity to make increasingly transparent display devices.

The display device may be used with variable levels of ambient light. For example, higher levels of ambient light on a front side or a back side of the display device tend to reduce the contrast of the display device. The lower contrast of the display device in these light conditions makes content such as images or graphics being displayed more difficult to see.

SUMMARY

A smart glass display is disclosed and includes a first glass layer, a second glass layer, a display layer, an auto-shading layer and a control module. The display layer is disposed between the first glass layer and the second glass layer and includes an array of light emitting diodes and at least one ambient light sensor. The at least one ambient light sensor is configured to detect a level of ambient light at the display layer. The auto-shading layer includes suspended particle devices each of which configured to selectively provide different levels of transparency. The control module is configured to, based on an output of the at least one ambient light sensor, adjust a transparency level of at least a portion of the auto-shading layer.

In other features, the at least one ambient light sensor includes ambient light sensors.

In other features, the at least one ambient light sensor is integrated in the display layer and is disposed within an outer periphery of the display layer.

In other features, the at least one ambient light sensor is disposed between light emitting diodes of the display layer.

In other features, the at least one ambient light sensor is in a same layer of the smart glass display as the display layer and is disposed outside of a periphery of the display layer.

In other features, the at least one ambient light sensor includes exterior ambient light sensors and one or more interior ambient light sensors.

In other features, the display layer is an outward facing display layer such that an image displayed on the display layer is visible on an exterior side of the smart glass display.

In other features, the display layer is an inward facing display layer such that an image displayed on the display layer is visible on an interior side of the smart glass display.

In other features, the control module includes: a comparator configured to obtain, based on the output of the at least one ambient light sensor, a brightness level; a vehicle message transceiver configured to obtain an image to display on the display layer; and an address driver configured to adjust brightness of at least a portion of the display layer based on the brightness level and drive the display layer to display the image.

In other features, the control module includes: a comparator configured to obtain a dimming level based on the output of the at least one ambient light sensor; a vehicle message transceiver configured to obtain an image to display on the display layer; an address driver configured to drive the display layer to display the image; and a shading driver configured to drive the auto-shading layer to adjust the transparency level of at least the portion of the auto-shading layer based on the dimming level.

In other features, the at least one ambient light sensor includes an interior ambient light sensor; and the control module is configured to adjust the dimming level based on an auto-shading level and an output of the interior ambient light sensor to compensate for an amount of auto-shading and determine an actual interior ambient light level.

In other features, a smart glass display is provided and includes: a first glass layer, a second glass layer, a display layer and a control module. The display layer is disposed between the first glass layer and the second glass layer and includes an array of light emitting diodes, suspended particle devices, and at least one ambient light sensor. At least one ambient light sensor is configured to detect a level of ambient light at the display layer. The suspended particle devices are each configured to selectively provide different levels of transparency. The control module is configured to, based on an output of the at least one ambient light sensor, adjust a transparency level of at least a portion of the display layer.

In other features, the at least one ambient light sensor includes only a single ambient light sensor.

In other features, the at least one ambient light sensor includes ambient light sensors.

In other features, the at least one ambient light sensor is integrated in the display layer and is disposed within an outer periphery of the display layer.

In other features, each of the at least one ambient light sensor is disposed between two of the light emitting diodes of the array of light emitting diodes.

In other features, the at least one ambient light sensor is in a same layer of the smart glass display as the display layer and is disposed outside of a periphery of the display layer.

In other features, the at least one ambient light sensor includes exterior ambient light sensors and one or more interior ambient light sensors.

In other features, the control module includes: a comparator configured to obtain, based on the output of the at least one ambient light sensor, a brightness level; a vehicle message transceiver configured to obtain an image to display on the display layer; and an address driver configured to adjust brightness of at least a portion of the display layer based on the brightness level and drive the display layer to display the image.

In other features, the control module includes: a comparator configured to obtain a dimming level based on the output of the at least one ambient light sensor; a vehicle message transceiver configured to obtain an image to display on the display layer; an address driver configured to drive the display layer to display the image; and a shading driver configured to drive the suspended particle devices to adjust the transparency level of at least the portion of the smart glass display based on the dimming level.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a cross-sectional side view of an example window with integrated smart glass display including a single exterior ambient light sensor according to the present disclosure;

FIG. 1B is a front view of the window of FIG. 1A;

FIG. 3A is a side cross-sectional side view of an example window with integrated smart glass display including multiple exterior ambient light sensors disposed outside of a perimeter of a display layer according to the present disclosure;

FIG. 3B is a front view of the window of FIG. 3A;

FIG. 4A is a side cross-sectional side view of an example window with integrated smart glass display including multiple exterior ambient light sensors and an interior ambient light sensor according to the present disclosure;

FIG. 4B is a front view of the window of FIG. 4A;

FIG. 10 is a side cross-sectional view of an auto-shading layer in a transparent mode according to the present disclosure;

FIG. 11 is a side cross-sectional view of the auto-shading layer of FIG. 10 in a dimming mode according to the present disclosure;

In the drawings, reference numbers may be reused to identify similar and/or identical elements.

DETAILED DESCRIPTION

Figure 2B:
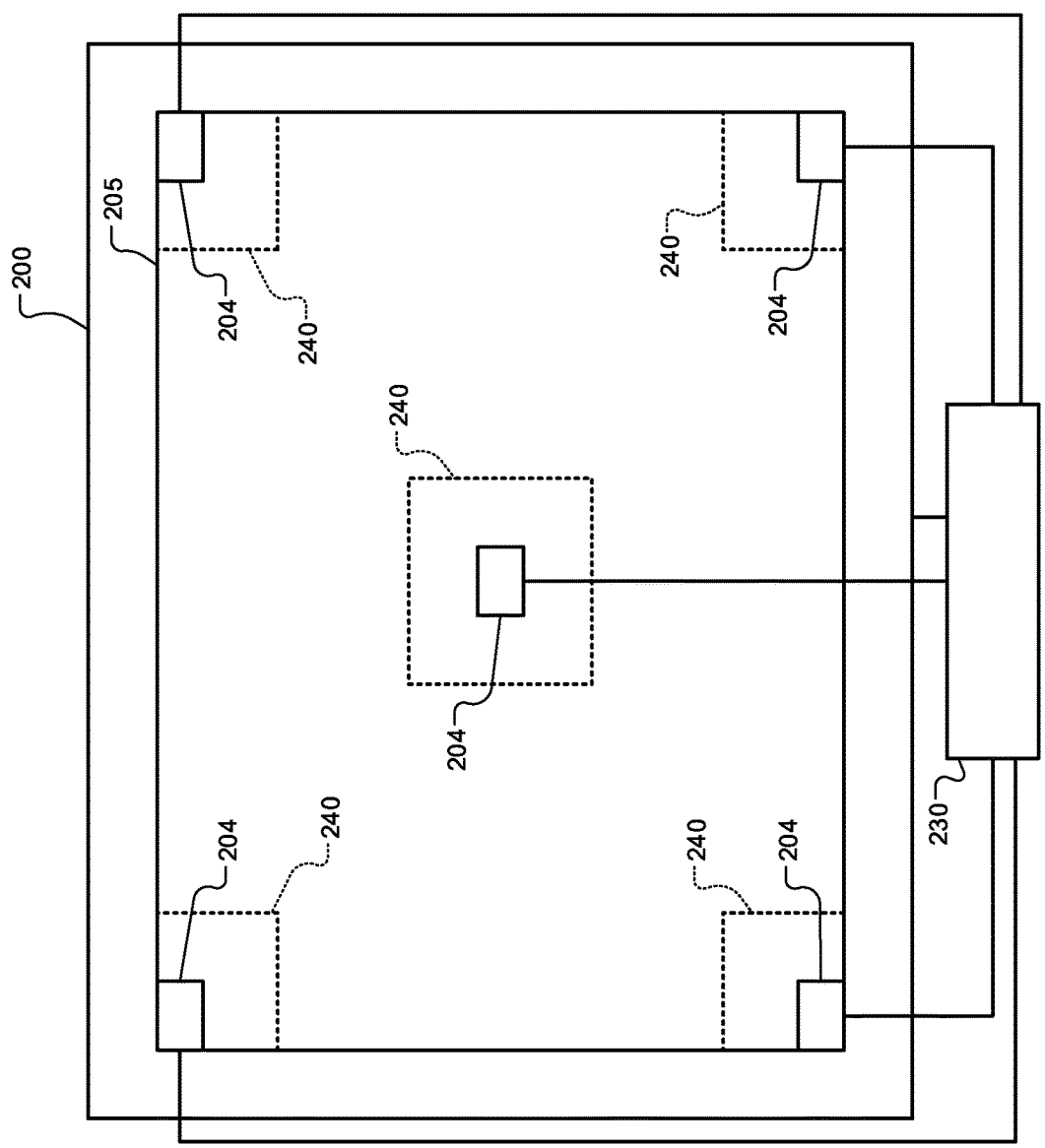
FIG. 2B is a front view of the window of FIG. 2A.

The present disclosure relates to a display devices able to operate in transparent and non-transparent modes with high contrast ratios. While the foregoing description relates to display devices and systems for vehicles, the display devices and systems described herein are applicable in other applications such as residential homes, commercial buildings, computer games, etc. The examples disclosed herein are applicable to automotive glass and non-automotive glass including architectural glass. The examples may be applied to any window of a vehicle including front, side and back windows, sunroofs and moon roofs.

A display device can be made transparent by arranging selectively transparent spaces between pixels of the display device and controlling the transparency or opacity thereof. Smaller scale display technologies such as micro light emitting diodes (LEDs) have more opportunity to make higher transparency display devices. However, the higher transparency of the display device reduces the contrast ratio due to undesired lighting from surroundings. For example, when the display is exposed to high ambient light conditions such as sunlight, readability worsens.

Auto-shading devices can be used to change light transmittance from transparent to opaque by applying voltage to embedded electrodes or not applying voltage to the embedded electrodes. This allows the background of an image to be darkened to adjust the contrast ratio of the image. Examples of auto-shading technologies include suspended particle devices and/or electrochromic devices. Outer transparent layers of glass or film are separated by spacers. Transparent conductive coatings or layers are arranged on inwardly facing surfaces of the outer transparent layers. Suspended particles are located between the conductive coatings or layers. When the voltage is applied to the electrodes, the particles align with the applied field and the corresponding portions are transparent. When the voltage is not applied to the electrodes, the particles return to their original orientation and the corresponding portions are opaque. Various levels of transparency may be provided by varying the voltages.

The smart glass display devices (or simply "smart glass displays") according to the present disclosure provide high selective contrast ratios relative to other transparent display devices. Locally disposed ambient light sensors are integrated in the smart glass displays and are used for selective global and local control over contrast ratios. This includes adjusting contrast ratios of specific cells and/or zones of the smart glass displays. Each cell may include one or more LEDs (or LED transistor circuits) and each zone may include one or more cells.

Methods are disclosed herein for automatically adjusting smart glass display brightness (or intensity) and auto-shading levels based on signals from laminated ambient light sensors. Control algorithms are implemented to change display brightness levels and auto-shading levels of the corresponding smart glass display based on exterior and interior lighting conditions. By being integrated in the smart glass displays, the laminated ambient light sensors measure light levels directly in front of and/or behind the smart glass display. Smart glass display control systems provide localized and global brightness and auto-shading level control of the smart glass displays. In some examples, multiple exterior ambient light sensors and one or more interior ambient light sensors are integrated into the smart glass displays. Auto-shading layers are included in the smart glass displays to locally control auto-shading levels. In some examples and depending on the layer stack-up and arrangement of the smart glass display, a dimming level calibration method is implemented to calibrate interior ambient light sensor(s) including determining the true interior ambient light levels and compensating for set auto-dimming levels.

By incorporating the ambient light sensors in the smart glass displays, the smart glass displays are not over or under driven based on ambient lighting conditions which is a concern for readability of a transparent display. The ambient light sensors provide an accurate measurement of ambient light levels on the smart glass displays. This is unlike a system that includes ambient light sensors in front of or above an interior cabin of a vehicle or located within an interior cabin of a vehicle, such as on a dashboard. Ambient light sensors in these locations do not provide accurate ambient light measurements for use in controlling brightness levels and/or auto-shading levels of transparent displays.

FIGS. 1A-1B show a window 100 with integrated smart glass display 102 including a single exterior ambient light sensor 104. The window 100 includes a front (or exterior) glass layer 106 and a back (or interior) glass layer 108. The smart glass display 102 includes a display layer 110 and an auto-shading layer 112, which are disposed between the glass layers 106, 108. A first resin layer 114 may be disposed between the front glass layer 106 and the display layer 110. The ambient light sensor 104 and the display layer 110 may be disposed on and connected to a substrate 116. The auto-shading layer 112 includes a transparency control layer 120 disposed between two resin layers 122, 124. The auto-shading layer 112 is disposed between the substrate 116 and the back glass layer 108. As an example, the resin layers 114, 122, 124 may be formed of polyvinyl butyral (PVB).

Exterior ambient light, represented by arrow 126, is detected by the ambient light sensor 104. A control module 130 receives an ambient light signal from the ambient light sensor 104 and adjusts a brightness level of the display layer 110 and/or a dimming level of the auto-shading layer 112 via the transparency control layer 120. This may be accomplished by adjusting voltages supplied to the display layer 110 and the auto-shading layer 112. This is described in further detail below. The ambient light sensor 104 may be disposed anywhere around the periphery of the display 102 or may be integrated in the display layer 110, as further described below.

In this example, the single embedded ambient light sensor 104 is used for global control of the brightness of the display layer 110 and the dimming of the auto-shading layer 112. In some embodiments, the example of FIGS. 1A-1B are applied to side windows of a vehicle. This control may be used to save power consumed in displaying images by decreasing brightness levels in darker ambient lighting conditions. Brightness may be increased when conditions call for increased brightness levels, such as when the window 100 is facing the sun.

The display layer 110 may be an exterior facing or an interior facing display layer 110. In an embodiment, the display layer 110 displays an image to a person external to a vehicle, which includes the window 100. In an embodiment, the display layer 110 displays an image to a person internal to a vehicle, which includes the window 100.

Figure 2A:
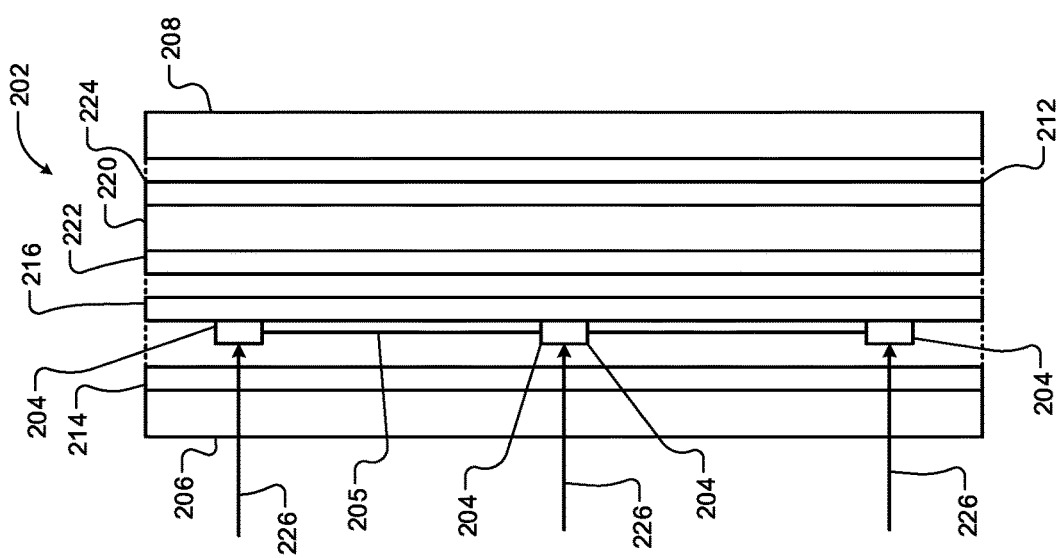
FIG. 2A is a side cross-sectional side view of an example window with integrated smart glass display including multiple exterior ambient light sensors disposed within a perimeter of a display layer according to the present disclosure.

FIGS. 2A-2B show a window 200 with integrated smart glass display 202 including multiple exterior ambient light sensors 204 disposed within a perimeter of a display layer 205. The window 200 includes a front (or exterior) glass layer 206 and a back (or interior) glass layer 208. The smart glass display 202 includes the display layer 205 and an auto-shading layer 212, which are disposed between the glass layers 206, 208. A first resin layer 214 may be disposed between the front glass layer 206 and the display layer 205. The ambient light sensors 204 and display layer 205 are disposed on and connected to a substrate 216. The auto-shading layer 212 includes a transparency control layer 220 disposed between two resin layers 222, 224. The auto-shading layer 212 is disposed between the substrate 216 and the back glass layer 208. As an example, the resin layers 214, 222, 224 may be formed of PVB.

Exterior ambient light, represented by arrows 226, is detected by the ambient light sensors 204. A control module 230 receives ambient light signals from the ambient light sensors 204 and adjusts one or more brightness levels of the display layer 205 and/or one or more dimming levels of the auto-shading layer 212 via the transparency control layer 220. This is described in further detail below. The ambient light sensors 204 may be disposed anywhere within the periphery of the display layer 205.

Although a particular number of ambient light sensors 204 are shown, any number of ambient light sensors may be included. In one embodiment, a matrix (or array) of ambient light sensors are included. Each of the ambient light sensors 204 may have corresponding areas 240, within which, for example, brightness levels of LEDs and/or a dimming level of a portion of the auto-shading layer 212 are set based on the output of that ambient light sensors 204. For example, brightness levels of LEDs of the display layer 205 within one of the areas 240 may be the same and set directly based on the output of the ambient light sensor associated with that area. A dimming level of the portion of the auto-shading layer 212 directly adjacent to and opposing the area of the ambient light sensor associated with that area may be directly set based on the output of that ambient light sensor. Brightness levels of other areas (i.e. areas of the display layer 205 that are between the areas 240) and dimming levels of other areas of the auto-shading layer 212 (i.e. areas not adjacent and opposite the areas 240) may be set based on outputs of the ambient light sensors 204 using interpolation, triangulation, weighting, etc. Ambient light levels in areas outside the areas 240 may be estimated and brightness levels and dimming levels are then set based on the estimated ambient light levels.

The display layer 205 may be an exterior facing or an interior facing display layer 205. In an embodiment, the display layer 205 displays an image to a person external to a vehicle, which includes the window 200. In an embodiment, the display layer 205 displays an image to a person internal to a vehicle, which includes the window 200.

The example of FIGS. 2A-2B include a multi (or matrix) embedded ambient light sensor display device that allows for estimating ambient light levels experienced across the display layer 205. The control module 230 may perform triangulation to determine locations of selected points on the display layer 205 that are between the ambient light sensors 204. The locations of the ambient light sensors 204 are known and may be used to determine locations of the selected points. Ambient light levels at these points may be estimated using interpolation, distances between the points and the ambient light sensors, and based on the ambient light levels measured by the ambient light sensors 204. This information may be used to provide more accurate data for global dimming control or to perform localized diming control based on detailed exterior ambient light conditions across the display layer 205. The smart glass display 202 is thus able to be locally or segmentally brightened and/or dimmed to account for non-uniform lighting conditions.

The inclusion of multiple ambient light sensors provides more accurate data for improved global and/or localized brightness and/or dimming control. The multiple ambient sensors may be used for: localized ambient light measurements; verifying accuracy of each of the ambient light sensors; and/or backing up data collected from each of the ambient light sensors. For example, if a first ambient light sensor is detecting a high level of light and a second ambient light sensor is detecting a low level of light, opposite brightness and dimming actions may be performed in a first area around the first ambient light sensor than brightness and dimming actions performed in an area around the second ambient light sensor. As another example, if the four ambient light sensors near the periphery (or corners) of the display layer 205 detect a high level of ambient light and the center located ambient light sensor detects a low level of light, then it is likely that the center ambient light sensor is operating inappropriately. Localized brightness and dimming control may be performed to compensate for detected light "hot spots" and glare. For example, brightness in one or more zones of the display layer 205 may be increased to overcome light from nearby street lamps, which are causing one or more bright spots on the front glass layer 206 and display layer 205.

FIGS. 3A-3B show a window 300 with integrated smart glass display 302 including multiple exterior ambient light sensors 304 disposed outside of a perimeter of a display layer 305. The window 300 includes a front (or exterior) glass layer 306 and a back (or interior) glass layer 308. The smart glass display 302 includes the display layer 305 and an auto-shading layer 312, which are disposed between the glass layers 306, 308. A first resin layer 314 may be disposed between the front glass layer 306 and the display layer 305. The ambient light sensors 304 and the display layer 305 may be disposed on and connected to a substrate 316. The auto-shading layer 312 includes a transparency control layer 320 disposed between two resin layers 322, 324. The auto-shading layer 312 is disposed between the substrate 316 and the back glass layer 308. As an example, the resin layers 314, 322, 324 may be formed of PVB.

Exterior ambient light, represented by arrows 326, is detected by the ambient light sensors 304. A control module 330 receives ambient light signals from the ambient light sensors 304 and adjusts one or more brightness levels of the display layer 305 and/or one or more dimming levels of the auto-shading layer 312 via the transparency control layer 320. This is described in further detail below. The ambient light sensors 304 may be disposed external to and around a periphery of the display layer 305.

Each of the ambient light sensors 304 may be used to estimate ambient light levels at points across the display layer 305. Brightness levels of areas of the display layer 305 and dimming levels of areas of the auto-shading layer 312 may be set based on outputs of the ambient light sensors 304 using interpolation, triangulation, weighting, etc. Ambient light levels in areas of the display layer 305 that are away from the ambient light sensors 304 may be estimated and brightness levels and dimming levels are then set based on the estimated ambient light levels.

The display layer 305 may be an exterior facing or an interior facing display layer 305. In an embodiment, the display layer 305 displays an image to a person external to a vehicle, which includes the window 300. In an embodiment, the display layer 305 displays an image to a person internal to a vehicle, which includes the window 300.

FIGS. 4A-4B show a window 400 with integrated smart glass display 402 including multiple exterior ambient light sensors 404 and an interior ambient light sensor 407. The window 400 includes a front (or exterior) glass layer 406 and a back (or interior) glass layer 408. The smart glass display 402 includes a display layer 410 and an auto-shading layer 412, which are disposed between the glass layers 406, 408. A first resin layer 414 may be disposed between the front glass layer 406 and the display layer 410. The ambient light sensors 404 and 407 and the display layer 410 may be disposed on and connected to a substrate 416. The auto-shading layer 412 includes a transparency control layer 420 disposed between two resin layers 422, 424. The auto-shading layer 412 is disposed between the substrate 416 and the back glass layer 408. As an example, the resin layers 414, 422, 424 may be formed of PVB.

Exterior ambient light, represented by arrows 426, is detected by the ambient light sensors 404. Interior ambient light, represented by arrows 428, is detected by the ambient light sensors 407. A control module 430 receives ambient light signals from the ambient light sensors 404, 407 and adjusts one or more brightness levels of the display layer 410 and/or one or more dimming levels of the auto-shading layer 412 via the transparency control layer 420. This is described in further detail below. The exterior ambient light sensors 404 may be disposed within a periphery of the display layer 410, as shown, or disposed external to and around a periphery of the display layer 410. The interior ambient light sensor 407 may be disposed external to and along the periphery of the display layer 410 or may be disposed within a periphery of the display layer 410.

Although a particular number of exterior ambient light sensors and a particular number of interior ambient light sensors are shown, any number of each may be included. Since the variance in exterior ambient light across the display layer 410 can be high and the variance in interior ambient light across the display layer 410 is typically minimal, fewer interior ambient light sensors (e.g., 1-2) than exterior light sensors (e.g., 1-10) may be included. The interior ambient light sensors allow the control module 430 to detect when, for example, an interior room or cabin is brightly lit up by the sun or other sources of light and compensate for that by adjusting the contrast ratio(s) of the smart glass display.

Each of the ambient light sensors 404, 407 may be used to estimate ambient light levels at points across the display layer 410. Brightness levels of areas of the display layer 410 and dimming levels of areas of the auto-shading layer 412 may be set based on outputs of the ambient light sensors 404 using interpolation, triangulation, weighting, etc. Ambient light levels in areas of the display layer 410 that are away from the ambient light sensors 404 may be estimated based on the outputs of the ambient light sensors 404 and brightness levels and dimming levels are then set based on the estimated ambient light levels. By gathering information on interior and exterior ambient lighting directly at the smart glass display 402 allows for adjusting brightness and auto-shading to provide high contrast ratios across the smart glass display 402. If the display layer 410 is outward facing and the interior of the vehicle is bright, brightness levels of the display layer 410 may be increased and dimming levels of the auto-shading layer 412 may be increased to increase the contrast ratio(s) of the smart glass display 402 for improved viewing of an image displayed on the display layer 410.

The display layer 410 may be an exterior facing or an interior facing display layer 410. In an embodiment, the display layer 410 displays an image to a person external to a vehicle, which includes the window 400. In an embodiment, the display layer 410 displays an image to a person internal to a vehicle, which includes the window 400.

The interior ambient light sensor and/or additional interior ambient light sensors may be incorporated in the examples of FIGS. 1A-3B.

Figure 5:
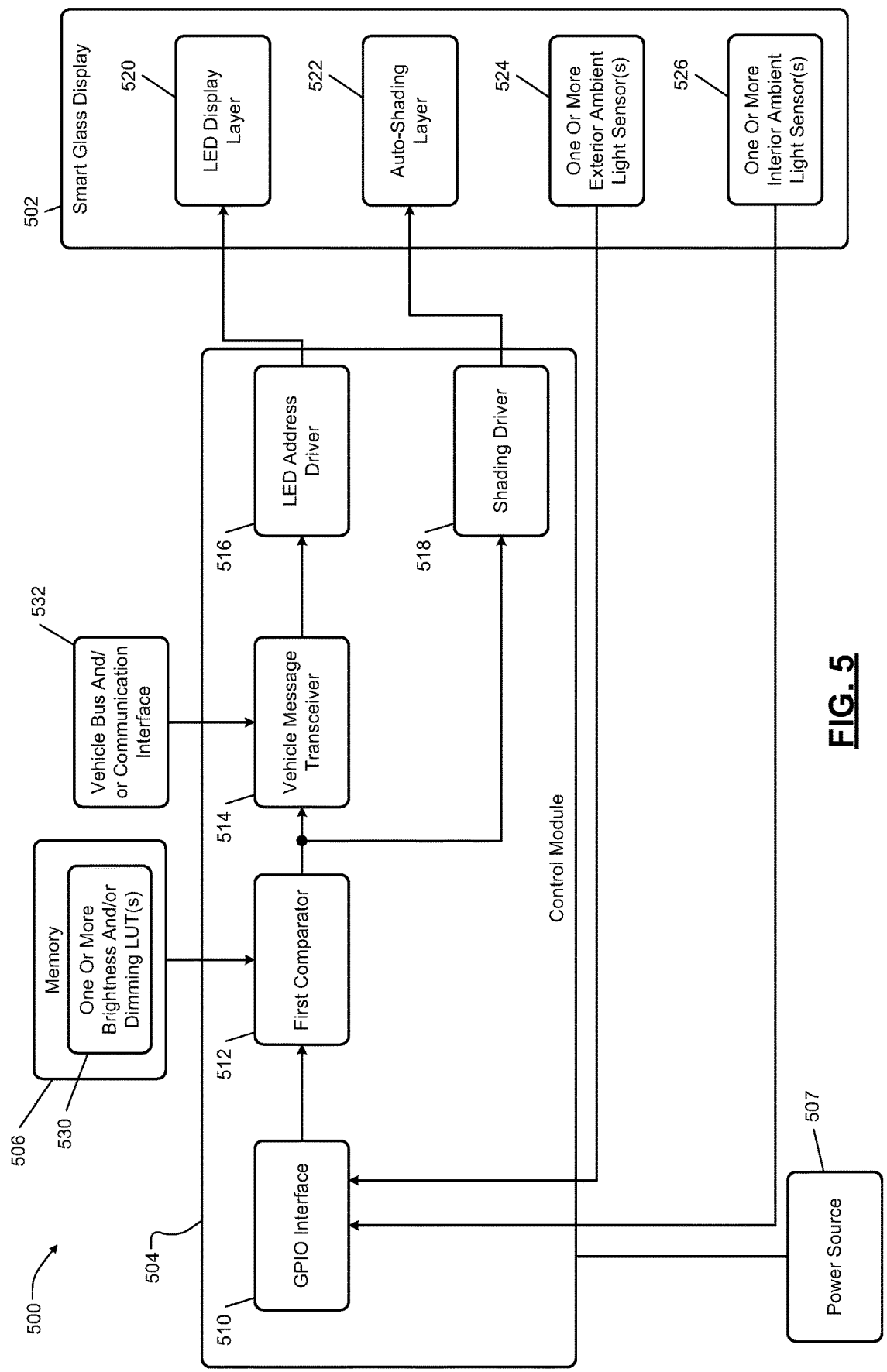
FIG. 5 is a functional block diagram of an example of a contrast control system for a smart glass display according to the present disclosure.

FIG. 5 shows a contrast control system 500 for a smart glass display 502. The smart glass display 502 may be implemented as any of the smart glass displays disclosed herein (e.g., any of the smart glass displays of FIGS. 1A-4B, 9, 12-13 and 16 and/or variations thereof). The contrast control system 500 includes a control module 504, which may replace and/or operate similarly as any of the other control modules disclosed herein, a memory 506 and a power source 507. The control module 504 may include a general purpose input/output (GPIO) interface 510, a first comparator 512, a vehicle message transceiver 514, a LED address driver 516 and a shading driver 518. The smart glass display 502 may include laminated glass (not shown), a LED display layer 520, an auto-shading layer 522, one or more exterior ambient light sensors 524, and one or more interior ambient light sensors 526. The memory 506 may store one or more brightness and/or dimming look-up tables (LUTs) 530 (or database). The brightness and dimming LUTs relate ambient light levels to brightness and dimming levels. A vehicle bus and/or communication interface 532 may be included and communicate with the vehicle message transceiver 514. Operation of the contrast control system 500 is further described below with respect to the method of FIG. 7. The power source 507 may include a battery pack and be a stand-alone power source or may receive power from an external power source. The power source 507 may receive utility power.

Figure 6:
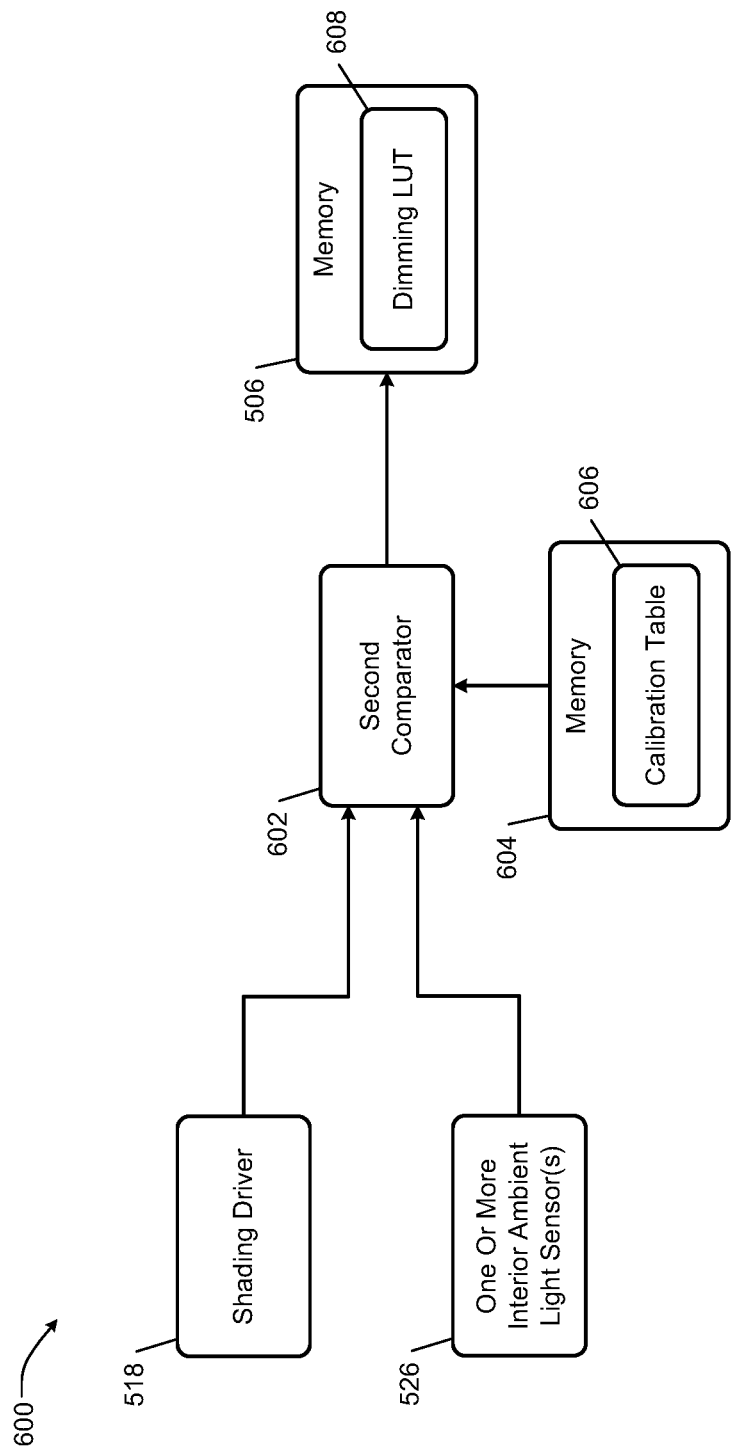
FIG. 6 is a functional block diagram of an example auto-shading look-up table (LUT) calibration system according to the present disclosure.

FIG. 6 shows an auto-shading LUT calibration system 600. The auto-shading LUT calibration system 600 may include the shading driver 518, the one or more interior ambient light sensors 526, a second comparator 602, a memory 604 and the memory 506. The second comparator 602 may be implemented in the control module 504 of FIG. 5. The memory 604 and the memory 506 may be implemented together as a single memory. The memory 604 may store a calibration table, such as that shown below as Table 1, where N is an integer. The calibration table may relate auto-shading levels to multipliers. This may include global and/or local multipliers. The memory 506 may store a dimming LUT 608, which may be a portion of or separate from a brightness and dimming LUT. Operation of auto-shading LUT calibration system 600 is further described below with respect to the method of FIG. 7.

TABLE 1

Auto-shading Level to Multiplier Conversion

| Auto-shading Level | Multiplier $M_i$ |
|---|---|
| $ASL_1$ | $M_1$ |
| $ASL_2$ | $M_2$ |
| $ASL_3$ | $M_3$ |
| . | . |
| . | . |
| . | . |
| $ASL_N$ | $M_N$ |

Figure 7:
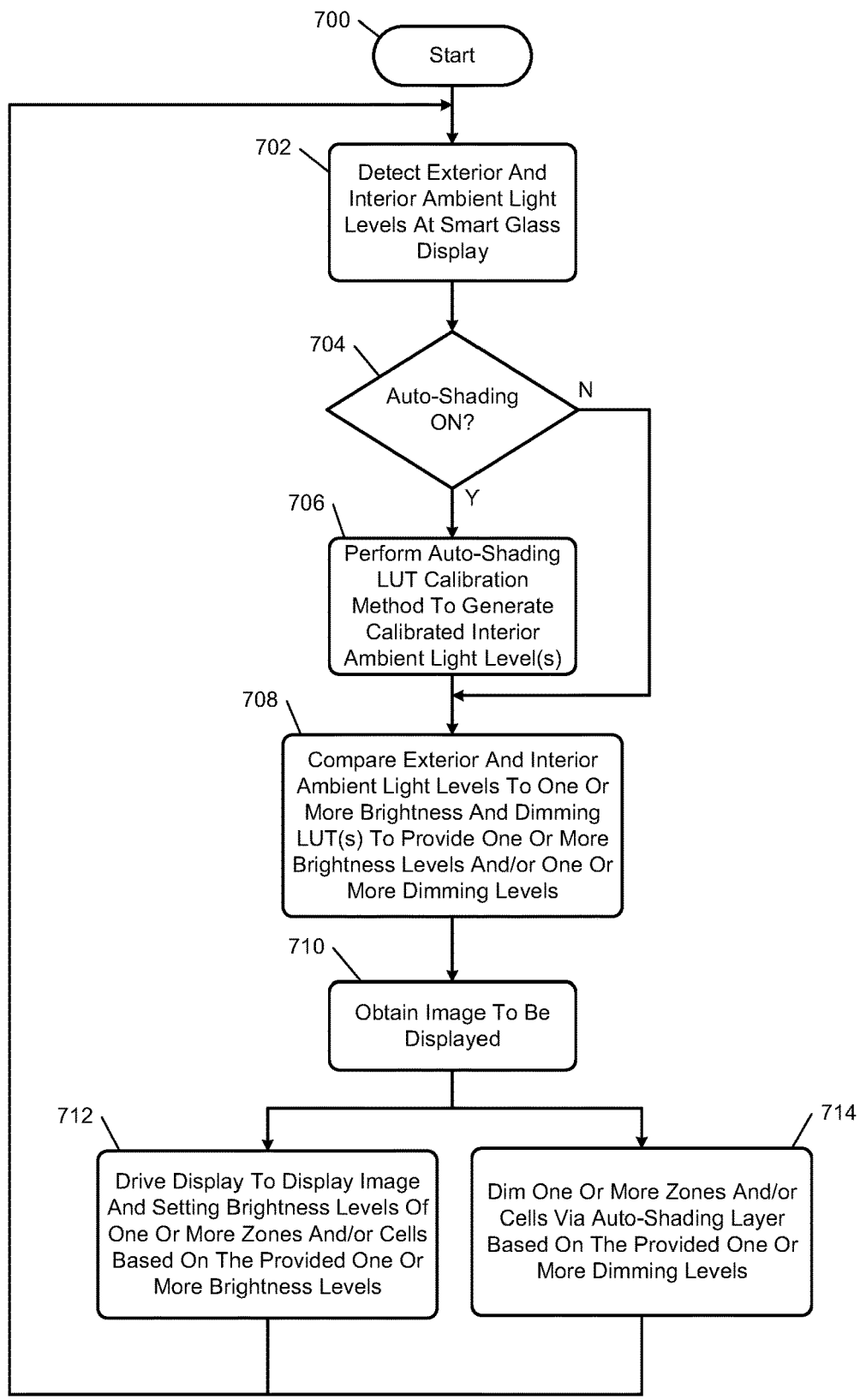
FIG. 7 illustrates a contrast control method according to the present disclosure.

FIG. 7 shows a contrast control method. Although the following operations are primarily described with respect to the contrast control system 500 of FIG. 5, the operations are applicable to the other embodiments disclosed herein. The following operations may be iteratively performed. The method may begin at 700.

At 702, exterior and/or interior ambient light levels are detected via the sensors 524, 526. The GPIO interface 510 may receive signals from the one or more exterior ambient light sensors 524 and/or the one or more interior ambient light sensors 526. This may include receiving signals from any of the ambient light sensors shown in FIGS. 1A-4B, 9, 12-13 and/or referred to herein.

At 704, the control module 504 may determine whether auto-shading is ON. If yes, operation 706 may be performed, otherwise operation 708 may be performed. At 706, the control module 504 may perform an auto-shading LUT calibration method, as described below with respect to FIG. 8.

At 708, the first comparator may compare the exterior and interior ambient light levels to one or more brightness and dimming LUT(s) to provide one or more brightness levels and/or one or more dimming levels. The brightness levels are provided to the vehicle message transceiver 514 and/or the LED address driver 516. The dimming levels are provided to the shading driver 518. The control module 504 and/or the comparator 512 may determine a brightness profile across the smart glass display and set the brightness levels and/or the dimming levels accordingly to provide high contrast ratios across the smart glass display.

At 710, the vehicle message transceiver 514 receives an image to be displayed on the LED display layer 520, which may be any of the display layers shown and/or described with respect to FIGS. 1A-4B, 9 and 12-13. As a few examples, images to be displayed may be obtained by the control module 504, received from the vehicle bus and/or communication interface 532, and/or obtained from a memory (e.g., the memory 506). The images may be for advertising, ride-hailing, and/or communication purposes. The images may be for individuals outside or inside of a vehicle.

At 712, the LED address driver 516 drives the LED display layer 520 to display the images obtained by the vehicle message transceiver 514 and based on the brightness levels received from the first comparator 512 and/or the vehicle message transceiver 514.

At 714, the shading driver 518 generates auto-shading signals to control SPDs of the auto-shading layer 522 based on the dimming levels received from the shading driver. The dimming levels received from the first comparator 512 at the shading driver 518 are converted to auto-shading levels and/or output voltages that are provided to the SPDs of the auto-shading layer 522. The auto-shading levels are used to set a levels of transparency or tint levels of cells and/or zones of the auto-shading layer. Each cell may include one or more SPDs and each zone may include one or more cells. Operation 714 may be performed while operation 712 is performed. Operation 702 may be performed subsequent to operations 712, 714.

Figure 8:
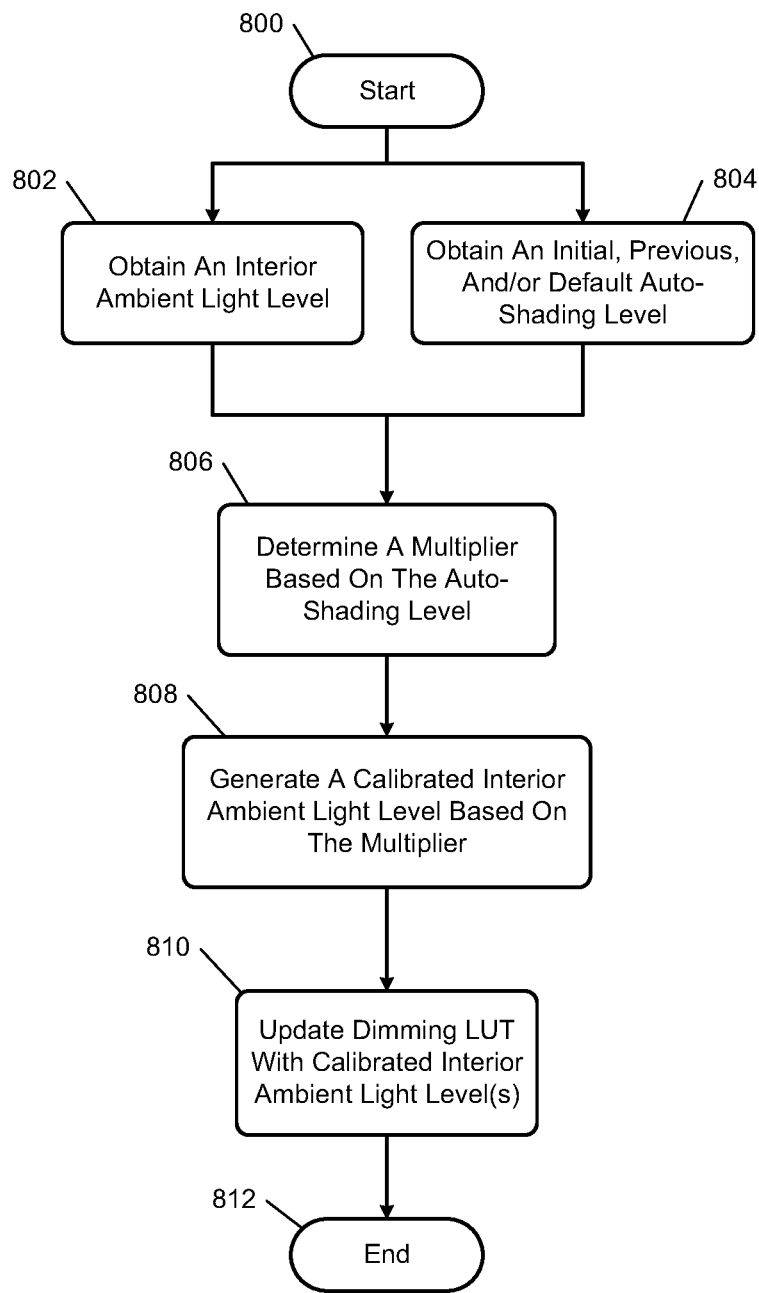
FIG. 8 illustrates an auto-shading calibration method according to the present disclosure.

FIG. 8 shows an auto-shading calibration method. Although the following operations are primarily described with respect to the auto-shading LUT calibration system 600 of FIGS. 5-6, the operations are applicable to the other embodiments disclosed herein. The following operations may be iteratively performed. Although the following operations are described with respect to a single un-calibrated interior ambient light level UL, a single auto-shading level and a single calibrated interior ambient light level CL, the operations may be performed for multiple un-calibrated interior ambient light levels from multiple ambient light sensors and/or multiple auto-shading levels for multiple zones to provide multiple calibrated interior ambient light levels.

The method may begin at 800. At 802, an un-calibrated interior ambient light level UL are detected respectively via one of the interior ambient light sensors 526.

At 804, the shading driver 518 may obtain one or more initial, previous, and/or default auto-shading levels i. At 806, the second comparator 602 determines a multiplier M based on the auto-shading level i, where i is an integer. The second comparator 602 may compare the auto-shading level i to other auto-shading levels in Table 1 to determine the multiplier M.

At 808, the second comparator 602 generates a calibrated interior ambient light level CL. The calibrated interior ambient light level CL may be generated using equation 1.

$$CL = UL \times Mi, \text{ where } Mi \geq 1 \qquad (1)$$

At 810, the second comparator 602 updates the dimming LUT 608 in the memory 506, which may then be used by the shading driver 518 when adjusting a dimming level of the auto-shading layer 522. The method may end at 812 subsequent to operation 810.

Figure 12:
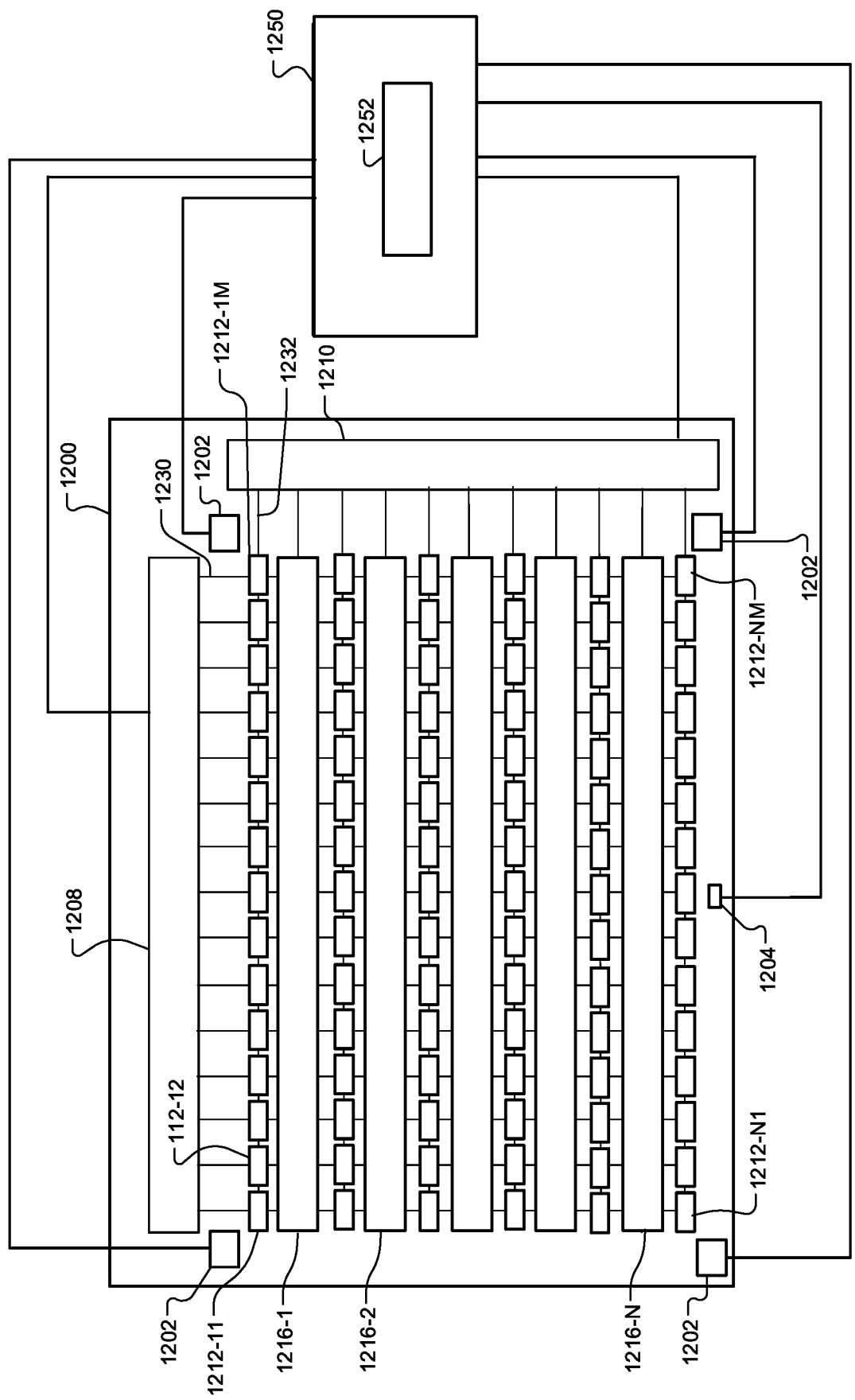
FIG. 12 is an example of a display including an array of light emitting diodes (LEDs), rows of suspended particle devices (SPDs), and exterior and interior ambient light sensors according to the present disclosure.
Figure 13:
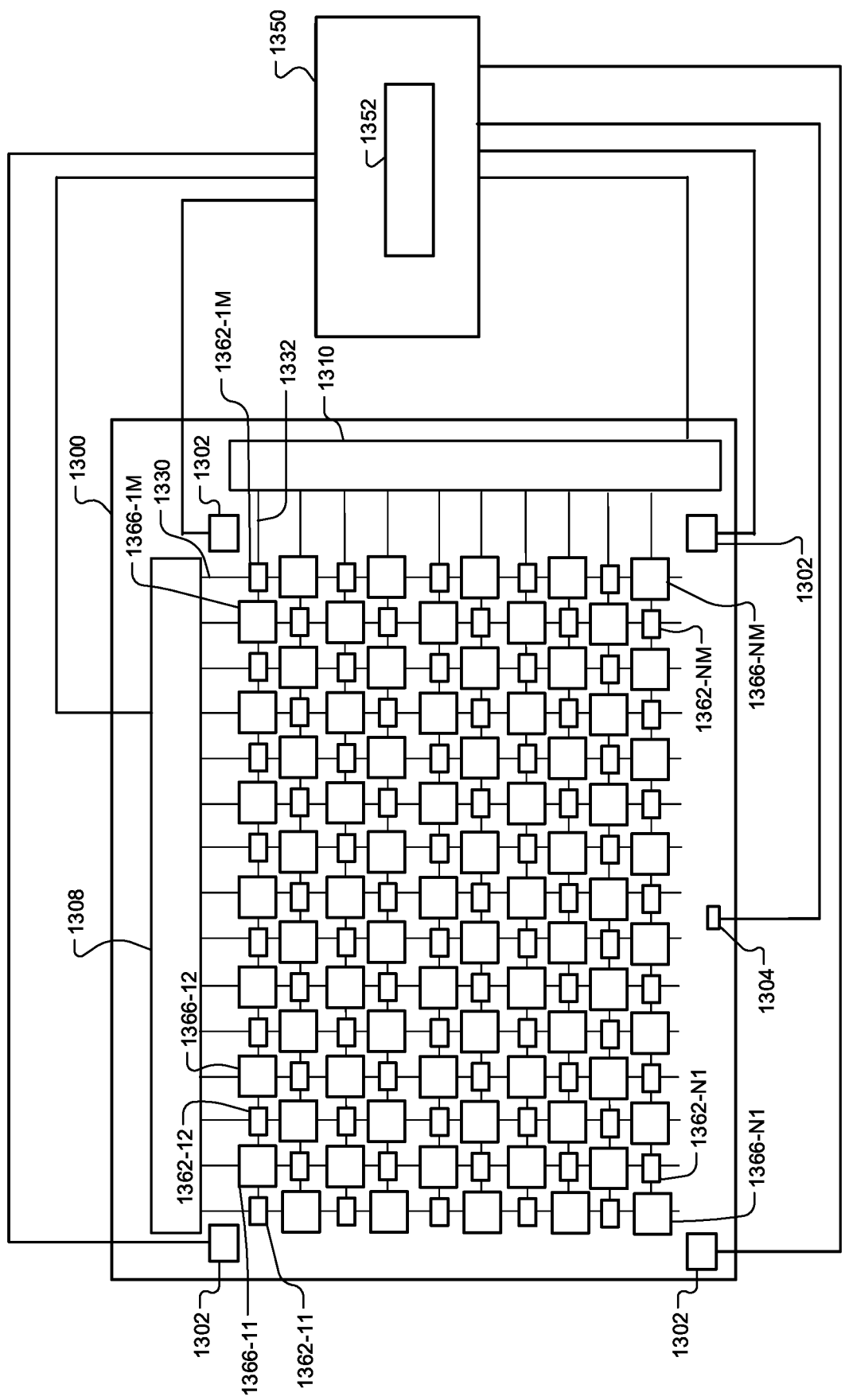
FIG. 13 is an example of a display including an array of light emitting diodes (LEDs), rows and columns of suspended particle devices (SPDs), and exterior and interior ambient light sensors according to the present disclosure.

The method of FIG. 8 compensates for when an auto-shading layer is disposed between (i) a display layer, which includes an interior ambient light sensor, and (ii) a background of the smart glass display and/or a rear glass layer of the smart glass display. The background may refer to an interior of a vehicle for an outward facing display or an exterior of the vehicle for an inward facing display. When in this arrangement and when auto-shading is active, the interior ambient light sensor may not detect the actual interior ambient light level due to the dimming of the auto-shading layer. The method of FIG. 8 increases the un-calibrated interior ambient light level to the calibrated interior ambient light level based on the level of dimming to provide an estimate of the actual interior ambient light level. When the display layer and the auto-shading layer are integrated into a single layer as shown in FIGS. 12-13, the method of FIG. 8 may not be performed.

Figure 9:
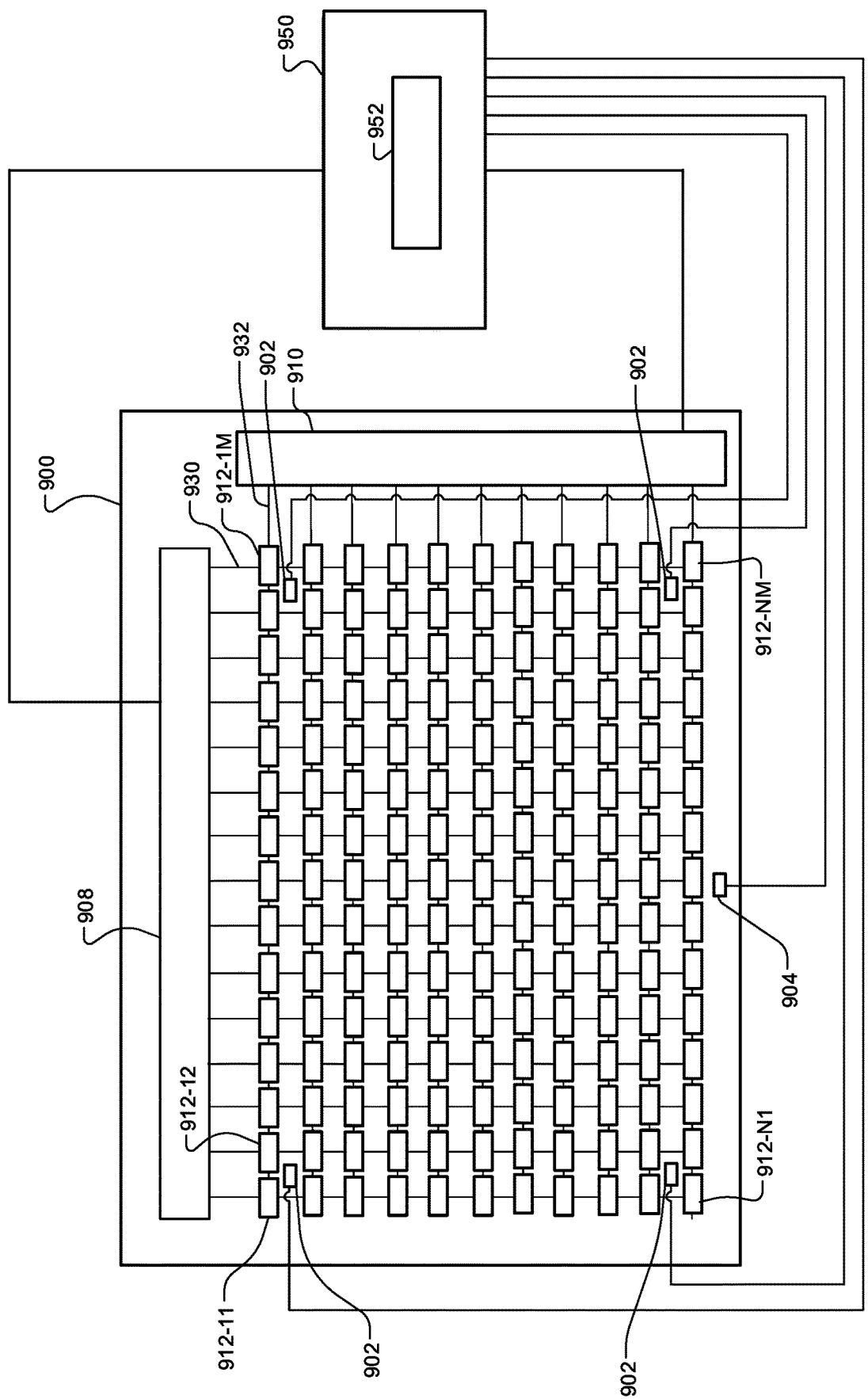
FIG. 9 is an example of a display including exterior and interior ambient light sensors according to the present disclosure.

FIG. 9 shows a display 900 including exterior ambient light sensors 902 and an interior ambient light sensor 904. The display 900 includes a data line 908, a scan line 910, and an array of light emitting diodes (LED) transistor circuits 912-11, . . . , and 912-NM, where N and M are integers (collectively LED transistor circuits 912) where N and M are integers. A display controller (or control module) 950 communicates with the data line 908 and the scan line 910. Electrodes 930 and 932 connect the data line 908 and scan line 910 to the LED transistor circuits 912. The display controller 950 executes a display application that selectively provides power to the LED transistor circuits 912. The LED transistor circuits may each include a LED, a transistor and/or other passive circuit elements.

The color of each of the LEDs of the LED transistor circuits 912 can be displayed in an on/off mode or at varying intensities between fully on and fully off. In the example shown, the LEDs of the LED transistor circuits 912 in each row vary in color (e.g. red, green and blue and then repeat) to form pixels. In some examples, the display 900 forms part of a windshield, rear glass, side windows, instrument panel, infotainment display, rearview mirror or other window or display.

While an N×M rectangular array is shown, non-uniform layouts can be used with other shapes. Selectively transparent spaces corresponding to SPDs in another layer (not shown), such as one of the auto-shading layers in FIGS. 1A-4B. The selectively transparent spaces can be configured to be transparent to opaque depending upon applied voltage to SPD electrodes as will be described further below.

The display controller 950 is configured to run the display application 952 that controls the LED transistor circuits 912 and SPD electrodes of the display 900 based on outputs of the sensors 902, 904. The display application 952 also controls power supplied to the SPD electrodes. In some examples, the display application 952 selectively controls switches to apply voltage to the SPD electrodes that determine whether or not the selectively transparent spaces are transparent or opaque based on sensed data such as ambient light conditions or other information.

FIGS. 10-11 show an auto-shading layer 1000 of a transparent display device respectively in a transparent mode (auto-shading off) and a dimming mode (auto-shading on). The dimming mode provides different levels of transparency and may be referred to as a non-transparent or opaque mode when the dimming level is high and no light is passing through the auto-shading layer 1000. The auto-shading layer 1000 may replace one of the auto-shading layers of FIGS. 1A-4B.

The auto-shading layer 1000 includes suspended particles. In some examples, the auto-shading layer 1000 includes a display side 1006 adjacent a display layer (not shown) and an opposite side 1008. The auto-shading layer 1000 may include one or more zones 1010 (three zones 1010a-c are shown) with the same or different levels of transparency (or dimming). Any number of zones may be included.

The auto-shading layer 1000 includes transparent layers 1014 and 1016 that are spaced apart by a predetermined distance in a direction transverse to a viewing direction of the auto-shading layer 1000. In some examples, the transparent layers 1014 and 1016 are made of glass, transparent resin film or other transparent material. In some examples, the zones 1010 are spaced apart by spacers 1022.

In the zones 1010, transparent conductive coatings or layers 1020 and 1024 are arranged in a pattern on inner, facing surfaces of the transparent layers 1014 and 1016. Suspended particles 1028 are located between the conductive coatings or layers 1020 and 1024. A display controller (or control module) selectively applies a voltage across the conductive coatings or layers 1020 and 1024 to change a level of transparency of the selectively zones 1010.

When a voltage potential is applied across the transparent conductive coatings or layers 1020 and 1024, the suspended particles align with the applied field and the selectively transparent region 1010 will be transparent as shown in FIG. 10. When the voltage potential is removed, the suspended particles 1028 return to a disordered state and the selectively transparent region 1010 will be obscured by the suspended particles 1028 as shown in FIG. 11.

In some examples, the suspended particles include crystals that are about 0.3 to 0.5 microns (μm) in length, although other types of particles can be used. The crystals act as induced dipoles when an electric field is applied to the conductive coatings or layers in the film. When the electric field is applied, the crystals line up and allow light to pass through. When the electric field is removed, the natural tendency of the crystals is to be misaligned due to Brownian movement. The misaligned crystals cause the glass to tint.

Auto-shading activation can be controlled based upon the occurrence of one or more events. For example, auto-shading can be transparent when measured ambient light sensed by ambient light sensors is less than a predetermined threshold and opaque when the ambient light is greater than the predetermined threshold. In other examples, auto-shading can be activated or deactivated in response to the presence or absence of an occupant inside the vehicle. Auto-shading can be activated or deactivated when the vehicle is started or in motion. For example, the auto-shading is deactivated when ambient light or interior light is too dim or nobody is in the car for interior facing display applications.

FIG. 12 shows a display 1200 including an array of LED transistor circuits 1212, rows of suspended particle devices (SPDs) 1216, exterior ambient sensors 1202, and an interior ambient light sensor 1204. The display 1200 includes a data line 1208, a scan line 1210, and an array of LED transistor circuits 1212-11, . . . , and 1212-NM, where N and M are integers (collectively LED transistor circuits 1212) where N and M are integers. A display controller 1250 communicates with the data line 1208 and the scan line 1210. Electrodes 1230 and 1232 connect the data line 1208 and scan line 1210 to the LED transistor circuits 1212 and SPDs 1216-1, 1216-2, . . . 1216-N (collectively SPDs 1216) between first rows of the LED transistor circuits 1212. The LED transistor circuits 1212 are arranged in rows. The SPDs are arranged in second rows and are each disposed between adjacent pairs of the first rows. A display controller 1250 executes a display application 1252 that selectively provides power to the LED transistor circuits 1212 and/or to the SPDs 1216.

The color of each of the LEDs of the LED transistor circuits 1212 can be displayed in an on/off mode or at varying intensities between fully on and fully off. In the example shown, the LEDs of the transistor circuits 1212 in each row vary in color (e.g. red, green and blue and then repeat) to form pixels. In some examples, the display 1200 forms part of a windshield, rear glass, side windows, instrument panel, infotainment display, rearview mirror or other window or display.

While an N×M rectangular array is shown, non-uniform layouts can be used with other shapes. Selectively transparent spaces corresponding to the SPDs 1216 are arranged between the LED transistor circuits 1212. The selectively transparent spaces can be configured to be transparent to opaque depending upon applied voltage to the SPDs as will be described further below. As will be described further below, the selectively transparent spaces and the LED transistor circuits 1212 are arranged in the same plane located between transparent layers as will be described further below in FIGS. 14-15.

FIG. 13 shows a display 1300 including an array of LED transistor circuits 1362, rows and columns of suspended particle devices (SPDs) 1366, exterior ambient light sensors 1302, and an interior ambient light sensor 1304. The LED transistor circuits 1362 and SPDs 1366 alternate in both row and/or column directions. The display 1300 include a data line 1308, a scan line 1310, an array of LED transistor circuits 1362-11, 1362-12, . . . , and 1362-NM (collectively LED transistor circuits 1362) and an array of SPDs 1366-11, 1366-12, . . . , and 1366-NM (collectively SPDs 1366). Electrodes 1330 and 1332 connect the data line 1308 and scan line 1310 to the LED transistor circuits 1362 and SPDs 1366. In each row and/or column, the LED transistor circuits 1362 alternate with the SPDs 1366. In some examples, adjacent rows are aligned with each other or offset from each other to create an alternating pattern in each row and column. A display controller 1350 executes a display application 1352 that selectively provides power to the LED transistor circuits 1362 and/or to the SPDs 1366.

Figure 14:
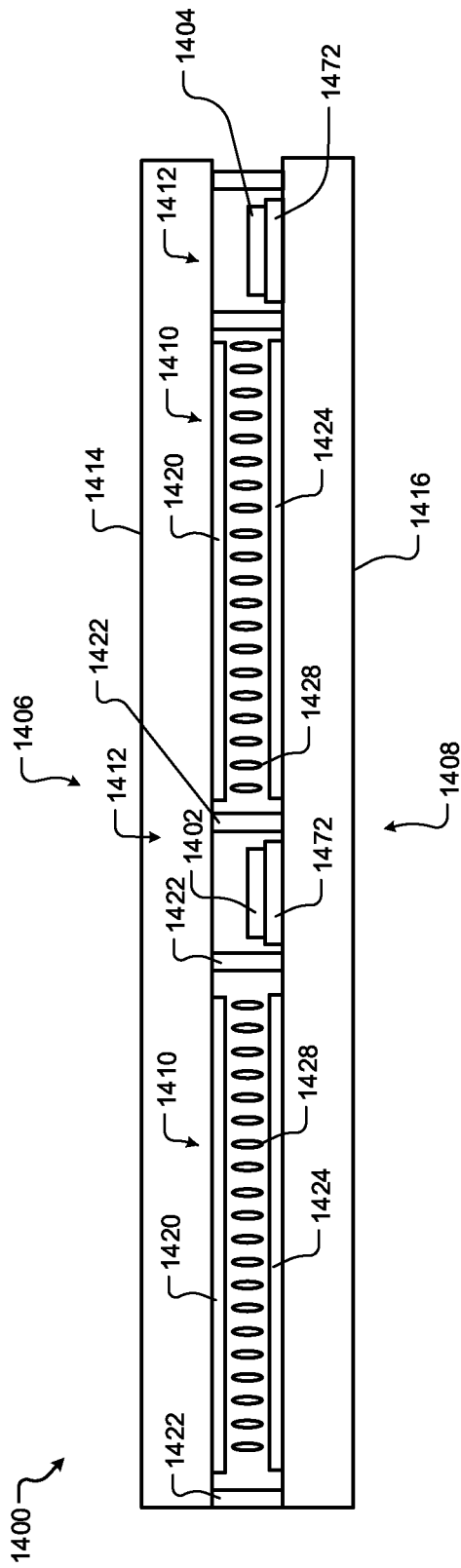
FIG. 14 is a side cross-sectional view of combined display and auto-shading layer in a transparent mode including LEDs and/or ambient light sensors according to the present disclosure.
Figure 15:
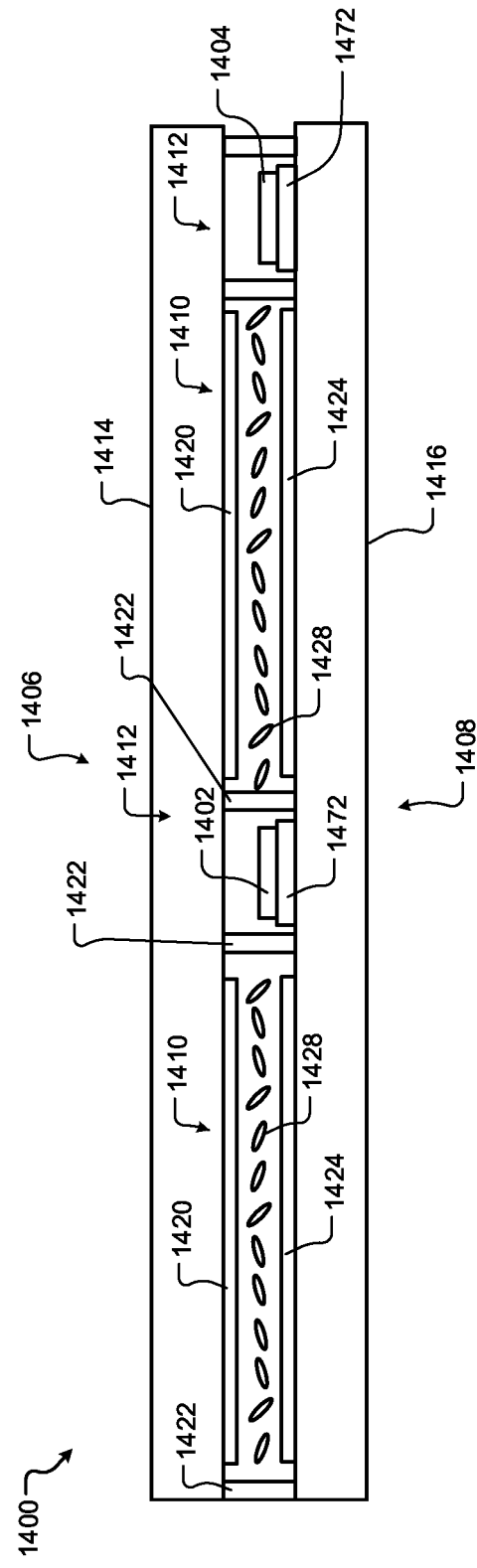
FIG. 15 is a side cross-sectional view of the combined display and auto-shading layer of FIG. 14 in a dimming mode according to the present disclosure.

FIGS. 14-15 shows a combined display and auto-shading layer 1400 including LED transistor circuits 1402 (one LED transistor circuit 1402 is shown) and/or ambient light sensors 1404 (one ambient light sensor is shown), which may include exterior and/or interior ambient light sensors. FIG. 14 shows the display and auto-shading layer in a transparent mode (auto-shading off). FIG. 15 shows the display and auto-shading layer in a dimming mode (auto-shading on). The display and auto-shading layer 1400 includes suspended particles arranged in spaces located between LED transistor circuits, ambient light sensors and/or pixels (including multiple LED transistor circuits). In some examples, the display and auto-shading layer 1400 includes a display side 1406 and an opposite side 1408. The display and auto-shading layer 1400 includes selectively transparent regions 1410 and LED/pixel regions 1412. In some examples, the LED/pixel regions 1412 are arranged in an array and are spaced apart at regular intervals by the transparent regions, although non-uniform spacing or other arrangements of pixels can be used.

The display and auto-shading layer 1400 includes transparent layers 1414 and 1416 that are spaced apart by a predetermined distance in a direction transverse to a viewing direction of the display and auto-shading layer 1400. In some examples, the transparent layers 1414 and 1416 are made of glass, transparent film or other transparent material. In some examples, the transparent regions 1410 are spaced apart by spacers 1422 that are located between the selectively transparent regions 1410 and the LED/pixel regions 1412.

In the selectively transparent regions 1410, transparent conductive coatings or layers 1420 and 1424 are arranged in a pattern on inner, facing surfaces of the transparent layers 1414 and 1416. Suspended particles 1428 are located between the conductive coatings or layers 1420 and 1424. A display controller selectively applies a voltage across the conductive coatings or layers 1420 and 1424 to change a level of transparency of the selectively transparent regions 1410.

When a voltage potential is applied across the transparent conductive coatings or layers 1420 and 1424, the suspended particles align with the applied field and the selectively transparent region 1410 will be transparent as shown in FIG. 14. When the voltage potential is removed, the suspended particles 1428 return to a disordered state and the selectively transparent region 1410 will be obscured by the suspended particles 1428 as shown in FIG. 15.

The LED/pixel regions 1412 are located between the selectively transparent regions 1410. Each of the LED/pixel regions 1412 includes one or more electrodes 1472 on which is disposed the LED transistor circuits 1402 and the ambient light sensors 1404. For example only, each of the LED/pixel regions 1412 may have LED transistor circuits including respectively red, green and blue LEDs.

Figure 16:
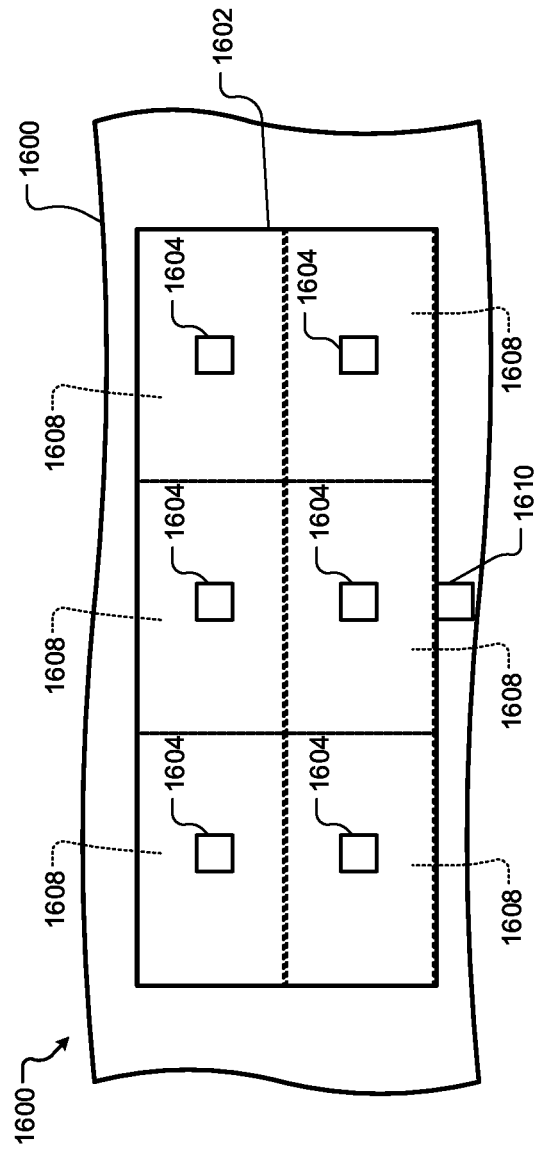
FIG. 16 is a front view of a window including an integrated smart glass display including another pattern of ambient light sensors according to the present disclosure.

FIG. 16 shows a window 1600 including an integrated smart glass display 1602 including another example pattern of exterior ambient light sensors 1604, which may be arranged in an array across a surface of the smart glass display 1602 and have respective zones 1608. The smart glass display 1602 may be configured similarly as other smart glass displays disclosed herein and include a display layer and an auto-shading layer. The display layer and the auto-shading layer may be integrated into a single layer or may be separate layers. The display layer may include the exterior ambient light sensors 1604 and an interior ambient light sensor 1610.

The displays referred to herein may include mini LEDs, micro LEDs, organic light emitting diodes (OLEDs), and/or other light sources. The ambient light sensors referred to herein may be implemented as phototransistors and laminated in glass. The exterior ambient light sensors referred to herein are outward facing sensors. The interior ambient light sensors referred to herein are inward facing sensors. The glass layers referred to herein may include laminated glass. By incorporating the ambient light sensors in a same layer as a display layer, the examples disclosed herein minimize the number of layers stacked to form a smart glass display and ease manufacturing. It is easier to incorporate the sensors in a layer that includes circuit elements as opposed to another layer that is passive and does not include circuit elements.

The examples disclosed herein allow for global and local adjustment of brightness levels and auto-shading levels to control transparency and contrast ratios of displays for improved visualization of displayed images. Global adjustment refers to adjusting a brightness level of an entire display layer and/or adjusting an auto-shading level of an entire auto-shading layer. Local adjustment refers to adjusting brightness levels of cells and/or zones differently of a display layer and/or adjusting auto-shading levels of cells and/or zones differently of an auto-shading layer. This holds true when the display layer and the auto-shading layer are integrated together as a single layer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any one embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A smart glass display comprising:
    a first glass layer of a window of a vehicle;
    a second glass layer of the window;
    a display layer disposed between the first glass layer and the second glass layer and comprising an array of light emitting diodes and at least one ambient light sensor, wherein the at least one ambient light sensor is configured to detect a level of ambient light at the display layer, and wherein the at least one ambient light sensor comprises one or more outer ambient light sensors and an inner ambient light sensor, the one or more outer ambient light sensors are disposed at an outer periphery of the display layer, and the inner ambient light sensor is disposed at a center of the display layer;
    an auto-shading layer comprising suspended particle devices each of which configured to selectively provide a plurality of different levels of transparency, wherein the auto-shading layer is configured to transition between different levels of transparency such that the smart glass display and corresponding portion of the window transition between different levels of transparency including transitioning between a transparent state, an opaque state, and one or more intermediate states, the one or more intermediate states being more transparent than the opaque state and less transparent than the transparent state; and
    a control module configured to i) determine an actual ambient light level of an area internal to the vehicle based on an output of an interior ambient light sensor and a level of auto-shading of the auto-shading layer, wherein a multiplier is determined based on the level of auto-shading, and the actual ambient light level is generated based on the multiplier and the output of the interior ambient light sensor, ii) based on the actual ambient light level, adjust a transparency level of at least a portion of the auto-shading layer, iii) use triangulation to determine locations of one or more selected points between the one or more outer ambient light sensors and the inner ambient light sensor, iv) estimate an ambient light level at the one or more selected points, and v) based on the estimated ambient light levels at the one or more selected points, adjust at least one of a brightness level of a respective portion of the display layer and an auto-dimming level of a respective portion of the auto-shading layer.

2. The smart glass display of claim 1, wherein:
    the control module is configured to, based on an output of each of the at least one ambient light sensors, adjust at least one of a brightness level of a respective portion of the display layer and an auto-dimming level of a respective portion of the auto-shading layer, wherein at least one of i) the brightness levels of the respective portions of the display layer are different, and ii) the auto-dimming levels of the respective portions of the auto-shading layer are different.

3. The smart glass display of claim 1, wherein one of the at least one ambient light sensor is integrated in the display layer and is disposed within an outer periphery of the display layer.

4. The smart glass display of claim 1, wherein the at least one ambient light sensor is disposed between light emitting diodes of the display layer.

5. The smart glass display of claim 1, wherein the at least one ambient light sensor is in a same layer of the smart glass display as the display layer and is disposed outside of a periphery of the display layer.

6. The smart glass display of claim 1, wherein:
    the at least one ambient light sensor comprises a plurality of exterior ambient light sensors and one or more interior ambient light sensors; and
    the control module is configured to adjust the transparency level based on an output of each of the plurality of exterior ambient light sensors and the one or more interior ambient light sensors.

7. The smart glass display of claim 6, wherein:
    the display layer is an outward facing display layer such that an image displayed on the display layer is visible on an exterior side of the smart glass display; and
    the display layer faces outward such that the image is visible on an exterior of the vehicle.

8. The smart glass display of claim 6, wherein:
    the display layer is an inward facing display layer such that an image displayed on the display layer is visible on an interior side of the smart glass display; and
    the display layer faces inward such that the image is visible from an interior of the vehicle.

9. The smart glass display of claim 1, wherein the control module is configured to:
    obtain, based on the output of the at least one ambient light sensor, a brightness level;
    obtain an image to display on the display layer; and
    adjust brightness of at least a portion of the display layer based on the brightness level and drive the display layer to display the image.

10. The smart glass display of claim 1, wherein the control module is configured to:

obtain a dimming level based on the output of the at least one ambient light sensor;
obtain an image to display on the display layer;
drive the display layer to display the image; and
drive the auto-shading layer to adjust the transparency level of at least the portion of the auto-shading layer based on the dimming level.

11. A smart glass display comprising:
a first glass layer;
a second glass layer;
a display layer disposed between the first glass layer and the second glass layer and comprising an array of light emitting diodes and at least one ambient light sensor, wherein the at least one ambient light sensor includes one or more outer ambient light sensors and an interior ambient light sensor, the one or more outer ambient light sensors are disposed at an outer periphery of the display layer, and the interior ambient light sensor is disposed at a center of the display layer and being configured to detect a level of ambient light at the display layer, the level of ambient light being indicative of or related to an actual ambient light level of an area internal to a vehicle and inward from the smart glass display;
an auto-shading layer comprising suspended particle devices each of which configured to selectively provide a plurality of different levels of transparency; and
a control module configured i) based on an output of the at least one ambient light sensor, to adjust a transparency level of at least a portion of the auto-shading layer, and to adjust a dimming level based on an auto-shading level and an output of the interior ambient light sensor to compensate for the level of auto-shading, and ii) determine the actual ambient light level based on the output of the interior ambient light sensor and the level of auto-shading, wherein a multiplier is determined based on the level of auto-shading, and the actual ambient light level is generated based on the multiplier and the output of the interior ambient light sensor;
wherein the control module is configured to i) use triangulation to determine locations of one or more selected points between the one or more outer ambient light sensors and the interior ambient light sensor, ii) estimate an ambient light level at the one or more selected points, and iii) based on the estimated ambient light levels at the one or more selected points, adjust at least one of a brightness level of a respective portion of the display layer and an auto-dimming level of a respective portion of the auto-shading layer.

12. A smart glass display comprising:
a first glass layer of a window of a vehicle;
a second glass layer of the window;
a display layer disposed between the first glass layer and the second glass layer and comprising an array of light emitting diodes, a plurality of suspended particle devices, and at least one ambient light sensor, wherein the at least one ambient light sensor is configured to detect a level of ambient light at the display layer, and wherein the suspended particle devices are each configured to selectively provide a plurality of different levels of transparency, wherein the display layer is configured to transition between the plurality of different levels of transparency such that the smart glass display and a corresponding portion of the window transition between different levels of transparency including transitioning between a transparent state, an opaque state, and one or more intermediate states, the one or more intermediate states being more transparent than the opaque state and less transparent than the transparent state, and
wherein the at least one ambient light sensor comprises one or more outer ambient light sensors and an inner ambient light sensor, the one or more outer ambient light sensors are disposed at an outer periphery of the display layer, and the inner ambient light sensor is disposed at a center of the display layer; and
a control module configured to i) determine an actual ambient light level of an area internal to the vehicle based on an output of an interior ambient light sensor and a level of auto-shading of the display layer, wherein a multiplier is determined based the level of auto-shading, and the actual ambient light level is generated based on the multiplier and the output of the interior ambient light sensor, ii) based on the actual ambient light level, adjust a transparency level of at least a portion of the auto-shading layer, iii) use triangulation to determine locations of one or more selected points between the one or more outer ambient light sensors and the inner ambient light sensor, iv) estimate an ambient light level at the one or more selected points, and v) based on the estimated ambient light levels at the one or more selected points, adjust at least one of a brightness level of a respective portion of the display layer and an auto-dimming level of a respective portion of the display layer.

13. The smart glass display of claim 12, wherein each of the at least one ambient light sensor is disposed between two of the light emitting diodes of the array of light emitting diodes.

14. The smart glass display of claim 12, wherein the at least one ambient light sensor is in a same layer of the smart glass display as the display layer and is disposed outside of a periphery of the display layer.

15. The smart glass display of claim 12, wherein the at least one ambient light sensor comprises a plurality of exterior ambient light sensors and one or more interior ambient light sensors.

16. The smart glass display of claim 12, wherein the control module is configured to:
obtain, based on the output of the at least one ambient light sensor, a brightness level;
obtain an image to display on the display layer; and
adjust brightness of at least a portion of the display layer based on the brightness level and drive the display layer to display the image.

17. The smart glass display of claim 12, wherein the control module is configured to:
obtain a dimming level based on the output of the at least one ambient light sensor;
obtain an image to display on the display layer;
drive the display layer to display the image; and
drive the plurality of suspended particle devices to adjust the transparency level of at least the portion of the smart glass display based on the dimming level.

18. The smart glass display of claim 1, wherein the control module is configured to perform at least one of global and local dimming based on the estimated ambient light levels at the one or more selected points.

19. The smart glass display of claim 1, wherein the control module is configured to adjust at least one of the brightness level and the auto-dimming level to compensate for hot spots based on outputs of the one or more outer ambient light sensors.

20. The smart glass display of claim 1, wherein the control module is configured to detect a fault with the inner ambient light sensor based on outputs of the one or more outer ambient light sensors.

* * * * *